United States Patent
Dai et al.

(10) Patent No.: US 11,714,944 B2
(45) Date of Patent: Aug. 1, 2023

(54) OPTIMIZATION OF PHYSICAL CELL PLACEMENT FOR INTEGRATED CIRCUITS

(71) Applicant: Motivo, Inc., Sunnyvale, CA (US)

(72) Inventors: Vito Dai, Santa Clara, CA (US); Edward Kah Ching Teoh, San Jose, CA (US); Ji Xu, San Jose, CA (US); Bharath Rangarajan, Sunnyvale, CA (US)

(73) Assignee: Motivo, Inc., Sunnyvale, CA (US)

( * ) Notice: Subject to any disclaimer, the term of this patent is extended or adjusted under 35 U.S.C. 154(b) by 182 days.

(21) Appl. No.: 17/139,016

(22) Filed: Dec. 31, 2020

(65) Prior Publication Data

US 2021/0124865 A1     Apr. 29, 2021

Related U.S. Application Data

(60) Division of application No. 16/185,521, filed on Nov. 9, 2018, now Pat. No. 10,936,778, which is a continuation-in-part of application No. 15/966,581, filed on Apr. 30, 2018, now Pat. No. 10,339,254, which is a continuation of application No. 15/343,536, filed on Nov. 4, 2016, now Pat. No. 9,959,380.

(Continued)

(51) Int. Cl.
*G06F 30/30* (2020.01)
*G06F 30/392* (2020.01)
(Continued)

(52) U.S. Cl.
CPC ............ *G06F 30/392* (2020.01); *G06F 30/18* (2020.01); *G06F 30/327* (2020.01); *G06F 30/33* (2020.01);
(Continued)

(58) Field of Classification Search
CPC ...... G06F 30/392; G06F 30/18; G06F 30/327; G06F 30/33; G06F 30/39; G06F 30/398;
(Continued)

(56) References Cited

U.S. PATENT DOCUMENTS 5,528,508 A * 6/1996 Russell ................. G06F 30/398
716/55
7,039,881 B2 * 5/2006 Regan ................. H01L 27/0207
716/108

(Continued)

FOREIGN PATENT DOCUMENTS

CN      103605817 A  *  2/2014  ......... G06F 17/5031
DE  102015100024 A1  *  7/2015  ............. G05B 15/02

(Continued)

OTHER PUBLICATIONS

JP Application No. 2018-551954; filed Jan. 19, 2017; Office Action dated Dec. 9, 2020 (4 pages).

(Continued)

*Primary Examiner* — Leigh M Garbowski
(74) *Attorney, Agent, or Firm* — Barclay Damon LLP

(57) ABSTRACT

In an embodiment, a method for optimizing an integrated circuit physical design for an integrated circuit. A physical design graph includes a plurality of physical design sub-configurations, each including a placement of a group of physical cells and having annotated characteristics. The method includes identifying, in the integrated circuit physical design, a first physical design sub-configuration including a first placement of a first group of the physical cells and having first annotated characteristics, the first annotated characteristics being outside target characteristics. The method includes selecting from the physical design graph, based on the first group of the physical cells and the target characteristics, at least a second physical design sub-configuration including a second placement of the first group of the physical cells and being within the target characteristics. The method includes replacing the first physical design sub-configuration in the integrated circuit physical design with the second physical design sub-configuration.

15 Claims, 23 Drawing Sheets

Related U.S. Application Data

(60) Provisional application No. 62/314,038, filed on Mar. 28, 2016.

(51) Int. Cl.
*G06F 30/18* (2020.01)
*G06F 30/33* (2020.01)
*G06F 30/39* (2020.01)
*G06F 30/327* (2020.01)
*G06F 30/398* (2020.01)
*G06F 30/00* (2020.01)
*G06F 30/13* (2020.01)
*G06F 119/18* (2020.01)

(52) U.S. Cl.
CPC ............ *G06F 30/39* (2020.01); *G06F 30/398* (2020.01); *G06F 30/00* (2020.01); *G06F 30/13* (2020.01); *G06F 2119/18* (2020.01)

(58) Field of Classification Search
CPC ...... G06F 30/00; G06F 30/13; G06F 2119/18; Y02P 90/00
See application file for complete search history.

(56) References Cited

U.S. PATENT DOCUMENTS

| | | | | |
|---|---|---|---|---|
| 8,516,408 B2 * | 8/2013 | Dell | ........................ | G06F 30/39 716/108 |
| 8,656,322 B1 * | 2/2014 | Dechene | ................ | G06F 30/39 716/55 |
| 8,918,751 B1 * | 12/2014 | McCracken | .......... | G06F 30/392 716/124 |
| 9,043,742 B1 * | 5/2015 | McCracken | .......... | G06F 30/392 716/135 |
| 9,141,743 B1 * | 9/2015 | McCracken | ............ | G06F 30/39 |
| 9,792,395 B1 * | 10/2017 | Pvss | ....................... | G06F 30/327 |
| 10,445,457 B1 * | 10/2019 | Loo | ........................ | G06F 30/367 |
| 2002/0166104 A1 | 11/2002 | Wu et al. | | |
| 2007/0011637 A1 * | 1/2007 | Seidl | ..................... | G06F 30/398 716/139 |
| 2011/0145775 A1 * | 6/2011 | Sano | ....................... | G06F 30/39 716/108 |
| 2013/0042217 A1 * | 2/2013 | Heng | ...................... | G06F 30/39 716/122 |
| 2015/0166104 A1 | 6/2015 | Ohhama et al. | | |
| 2016/0085898 A1 * | 3/2016 | Manohar | ............... | G06F 30/392 716/124 |

FOREIGN PATENT DOCUMENTS

JP   H05-101127 A   4/1993
JP   2013-175016 A   9/2013

OTHER PUBLICATIONS

JP Application No. 2018-551954; filed Jan. 19, 2017; English translation of Office Action dated Dec. 9, 2020 (6 pages).

\* cited by examiner

| CONFIGURATION | PATTERN | ANNOTATION | | |
|---|---|---|---|---|
| | | PATTERN CHARACTERISTICS | DSA APPROACHES AND GUIDING PATTERN(S) | |
| | | | GRAPHO-EPITAXY | CHEMO-EPITAXY |
| 1301 | | | | |
| 1302 | 1307 | 1308 — DIRECTIONALITY: 1-DIRECTIONAL<br>PERIODICITY: 1 PITCH, P<br>APPLICABLE LAYERS: FIN, POLY GATE, METAL<br>... | 1309 — 3p | 2p |
| 1303 | p1 p2 | DIRECTIONALITY: 1-DIRECTIONAL<br>PERIODICITY: 2 PITCHS, P1, P2<br>APPLICABLE LAYERS: FIN, POLY GATE, METAL<br>... | 2p1, p2-p1 | NA |
| 1304 | p2 p1 / p1 p2 | DIRECTIONALITY: 2-DIRECTIONAL<br>PERIODICITY: 2 PITCHS, P1, P2<br>APPLICABLE LAYERS: FIN, POLY GATE, METAL<br>... | 2p2, 2p2, p2, p1-p2 | NA |
| 1305 | p p | DIRECTIONALITY: NA<br>PERIODICITY: 1 PITCH, P<br>APPLICABLE LAYERS: CONTACTS, VIAS<br>... | 4p | 4p |

FIG. 13

| CONFIGURATION | PATTERN | ANNOTATION | | | | | |
|---|---|---|---|---|---|---|---|
| | | PATTERN CHARACTERISTICS | MULTIPLE PATTERNING STRATEGIES | | | | |
| | | | LELE | LELELE | SADP | SAQP | |
| 1411 | 1415 | 1416<br>• DIRECTIONALITY: 1-DIRECTIONAL<br>• PERIODICITY: 1 PITCH<br>   • $P < P_{min}$ for same_color<br>• MINIMUM COMMON RUN LENGTH<br>   LENGTH h = 50 nm<br>• ODD CYCLE: NO<br>• APPLICABLE LAYERS: FIN, POLY, GATE, METAL | Y | Y | Y | Y | 1417 |
| 1412 | | • DIRECTIONALITY: 1-DIRECTIONAL<br>• PERIODICITY: 1 PITCH<br>   • $P < P_{min}$ for same_color<br>• MINIMUM COMMON RUN LENGTH<br>   LENGTH H = 10 nm<br>• ODD CYCLE: NO<br>• APPLICABLE LAYERS: FIN, POLY, GATE, METAL | Y | Y | N | N | |
| 1413 | | • DIRECTIONALITY: 2-DIRECTIONAL<br>• PERIODICITY: 1 PITCH<br>• ODD CYCLE: YES<br>• APPLICABLE LAYERS: FIN, POLY, GATE, METAL | N | Y | Y | Y | |

OPTIMIZATION OF PHYSICAL CELL PLACEMENT FOR INTEGRATED CIRCUITS

CROSS-REFERENCE TO RELATED APPLICATIONS

This application is a divisional application of U.S. patent application Ser. No. 16/185,521, filed on Nov. 9, 2018, which is a continuation-in part of, and claims the benefit and priority of, U.S. patent application Ser. No. 15/966,581, filed on Apr. 30, 2018, which issued as U.S. Pat. No. 10,339,254, which claims priority to U.S. patent application Ser. No. 15/343,536 filed on Nov. 4, 2016, which issued as U.S. Pat. No. 9,959,380, which claims priority to U.S. Provisional Patent Application Ser. No. 62/314,038, filed Mar. 28, 2016, the entirety of each of which is incorporated herein by reference.

BACKGROUND

The present disclosure relates to the design and manufacturing of integrated circuits and, more specifically, to the use of databases, graphs, machine learning, search algorithms, etc., for optimizing complex multi-dimensional integrated circuit design and manufacturing configurations, for example, to improve design and manufacturing objectives, such as manufacturing yield.

By way of example, integrated circuit manufacturing yield may be the result of a complex multi-dimensional set of interactions among process, materials, tool settings, design variations, design complexity and other random events. The rapid pace of the semiconductor industry and the ever-increasing cost and competitive pressures on the integrated circuit fabrication plant (fab) contributes to the challenge of improving yield.

Traditional yield improvement efforts typically address problems after they have occurred. For example, engineers may observe problems in simulation, through physical defects on the integrated circuit devices, or in electrical failures of devices. High frequency problems may be prioritized the cause of each problem may be isolated through hypothetical analysis. Once a hypothetical cause is identified, the integrated circuit design or manufacturing process may be changed to attempt to remove the cause of the problem or to add a safety margin to mitigate the impact of the problem.

Subsequent observations may be used to determine whether the changes demonstrate an improvement over the prior method.

Any changes that demonstrate a significant reduction in observed problems may be preserved, and any changes that demonstrate an increase in observed problems may be discarded. Disadvantageously, some changes demonstrate a reduction in some problems, but also introduce new problems. This ambiguous result is a consequence of complex multi-factorial interactions in design and manufacturing. Consequently, the ramp up in improvement of yield is a laborious process that takes place over several years. Furthermore, the difficulty in execution of this process continues to increase as both the integrated circuit designs, and their fabrication process increase in complexity. This is evidenced in the industry by increased design and manufacturing cost per technology node, the consolidation of integrated circuit design and manufacturing companies, and the slowing of the pace of introduction of new technology nodes.

Restricted design rules are often used in an attempt to eliminate pre-identified, yield-limiting structures. However, even these restricted design rules can allow a number of yield-limiting patterns to enter the fab, and additional defects may be discovered after problems or failures are caused. In such a manual improvement process, the cycle of learning is repeated, new yield-limiters are identified and eliminated, and eventually the yield may increase incrementally.

SUMMARY

In an embodiment, a method for designing an integrated circuit with target characteristics uses a physical design graph (e.g., a physical design configuration graph). The physical design graph includes a plurality of physical design sub-configurations, each of the plurality of physical design sub-configurations including a placement of a group of physical cells and having annotated characteristics. The method includes partitioning an integrated circuit electrical design into a plurality of electrical design sub-configurations, including a specific electrical design sub-configuration requiring a specific group of the physical cells. The method includes selecting from the physical design graph, based on the required specific group of the physical cells and the target characteristics, a physical design sub-configuration including the specific group of the physical cells in a specific placement and having the target characteristics. The method includes determining an integrated circuit physical design for manufacturing the integrated circuit, the integrated circuit physical design comprising the physical design sub-configuration including the specific placement of the specific group of the physical cells.

In an embodiment, a method for optimizing an integrated circuit physical design for an integrated circuit with target characteristics uses a physical design graph. The physical design graph includes a plurality of physical design sub-configurations, each of the plurality of physical design sub-configurations including a placement of a group of physical cells and having annotated characteristics. The method includes identifying, in the integrated circuit physical design, a first physical design sub-configuration including a first placement of a first group of the physical cells and having first annotated characteristics, the first annotated characteristics being outside the target characteristics. The method includes selecting from the physical design graph, based on the first group of the physical cells and the target characteristics, at least a second physical design sub-configuration including a second placement of the first group of the physical cells and being within the target characteristics. The method includes replacing the first physical design sub-configuration in the integrated circuit physical design with the second physical design sub-configuration.

In an embodiment, a system for designing an integrated circuit with target characteristics includes a database and one or more processors programmed to perform a method. The database includes a physical design graph, the physical design graph including a plurality of physical design sub-configurations, each of the plurality of physical design sub-configurations including a placement of a group of physical cells and having annotated characteristics. The method includes partitioning an integrated circuit electrical design into a plurality of electrical design sub-configurations, including a specific electrical design sub-configuration requiring a specific group of the physical cells. The method includes selecting from the physical design graph, based on the required specific group of the physical cells and the target characteristics, a physical design sub-configuration including the specific group of the physical cells in a specific placement and having the target characteristics. The method includes determining an integrated circuit physical design for manufacturing the integrated circuit, the integrated circuit physical design comprising the physical design sub-configuration including the specific placement of the specific group of the physical cells.

The above embodiments are exemplary only. Other embodiments are within the scope of the disclosed subject matter.

BRIEF DESCRIPTION OF THE SEVERAL VIEWS OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views.

FIG. 13 illustrates annotating a layout pattern configuration graph in a directed self-assembly (DSA) system, in accordance with aspects set forth herein.

FIG. 14 illustrates annotating a layout pattern configuration graph in a multiple-patterning system, in accordance with aspects set forth herein.

FIG. 15 illustrates annotating a layout pattern configuration graph in a Focus-Exposure Matrix system, in accordance with aspects set forth herein.

DETAILED DESCRIPTION

Figure 1:
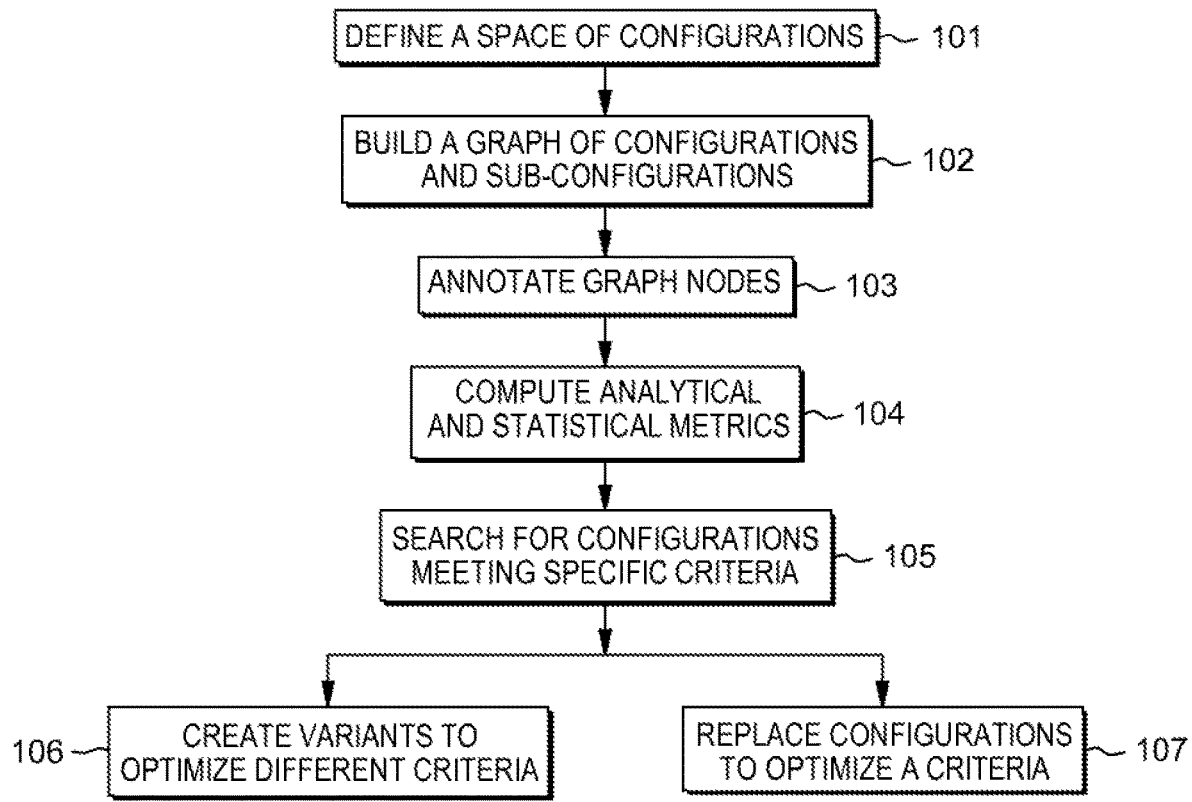
FIG. 1 is a high-level flowchart of an exemplary integrated circuit design method, in accordance with aspects set forth herein.

Embodiments of the disclosed subject matter provide techniques for determining or optimizing integrated circuit designs, such as integrated circuit electrical designs. The techniques may be used to determine a physical layout pattern, a netlist, and/or a tool process for the integrated circuit design, for example, by accessing, using, and/or building a configuration graph. Other embodiments are within the scope of the disclosed subject matter.

Pattern-based technologies, such as pattern matching and classification, may be used to address yield and manufacturing issues. Using these approaches, a problem may be specified or defined, and once defined, may be addressed or fixed. In addition, pattern-based technologies may be used to react to emergent problems in the manufacturing process. However, a challenge remains when determining the correct amount of context to include in a pattern.

In general, a pattern with a large context is very specific and matches few instances, but a pattern with a small context is very general and matches many instances. The optimal amount of context to include varies with the problem. For example, a lithographic patterning problem may require a much larger context than a problem with interconnect to vertical interconnect access (via) integration. When a problem results from a complex combination of multiple factors, heuristics or trial and error may be used to find an approximate amount of context to include.

The techniques presented herein may be used to characterize design variation, i.e., the intrinsic entropy of a design. By characterizing design variation, an understanding of the cause of design variation and its effects on manufacturing may be better understood. For example, in the fab, engineers can observe correlations between design configurations, manufacturing process configurations, physical defects and electrical device failures, in order to better understand the role that design variation plays. The present disclosure provides tools and technology to analyze and address design issues caused by the amount and complexity of design variations. Advantageously, the present techniques allow the analysis of a new design, such as a design having millions of patterns that a fab engineer has never seen before, even when some of these heretofore unseen patterns are problematic. The present techniques allow for the disposition of numerous design variations, allowing for a determination if the design variations are problematic or not, known or unknown, etc., thus allowing for optimizing design and manufacturing processes for yield.

The present disclosure is generally directed to improved systematic characterization of design and manufacturing configurations, and improved optimization of design and manufacturing for yield. Traditional yield improvement approaches characterize problems after they have occurred. Engineers observe problems in simulation, in physical defects on the integrated circuit devices, or in electrical failures of the devices. They prioritize high frequency problems and then attempt to isolate the cause of each problem through hypothesis. They change the integrated circuit design, or change its manufacturing process to remove the cause or to add margin to mitigate the impact. Further observations determine whether the changes demonstrate an improvement, validating or invalidating the hypothesis. In summary, the traditional approach reacts to problems, rather than prevent them, and focuses solely on detected failures, missing near failures or infrequent failures. In general, the yield is improved through accumulation of experimental changes, but the iterative trial-and-error process is time consuming, and final solution is non-optimal.

The present disclosure describes, in part, a method for full characterization and search of the entire design and manufacturing configuration space and a system for implementing this method. All design and manufacturing variations are part of this space, and therefore, the coverage of observational data on this space can be computed. Furthermore, the variations for which there is a lack of coverage of observational data can also be computed. These variations can be used to systematically drive future data acquisition, eventually resulting in complete characterization of the entire configuration space. Within the configuration space, the concept of "making changes to improve yield" is equivalent to "replacing one design and manufacturing configuration with another to improve yield." Consequently, the problem of yield improvement can be reformulated as a computation problem to "search for the optimal design and manufacturing configuration to improve yield."

By way of high-level overview the present techniques provide, for example, a computer-implemented method that defines a design configuration space, and allows for a complete or partial set of configurations that exist in the design space to be computed. For instance, this configuration space includes complete or partial coverage of configurations both present in and missing from any given design. Each computed configuration may be assigned a node within a graph structure, with directed edges linking configurations to sub-configurations. Each configuration node may be further annotated with design-intrinsic data, for example count, frequency, location of occurrences, and design-extrinsic manufacturing data, for example observed defects, simulation results, optical-proximity correction results, hot spot data, critical dimension measurements from metrology, scan chain test results, and failure analysis results. Using this graph structure, analytical and statistical metrics may be computed and annotated back to the graph structure. The graph structure may then be searched to identify the set of all configurations that meet specific criteria. In one application, the graph is searched for configurations that are considered problematic, based on previously computed metrics. These configurations may be eliminated, modified, resized, or replaced with a non-problematic configuration. In another example, these configurations may be highlighted for active monitoring or process control. In another application, the graph structure may be searched for known configurations of interest. Then using graph traversal, configuration variants, for which there is little or no known data, may be generated for further exploration and characterization. The degree of completeness of the space on which the graph is defined may improve the comprehensiveness of the graph, and consequently the comprehensiveness of search and optimization solutions.

FIG. 1 illustrates a process flow diagram or flow chart of a method or process 100 that may be used to build, characterize and search a configuration space. For example, process 100 may run on integrated circuit design system 1900 (see FIG. 19). The process 100 described in FIG. 1 may be used for determining a physical layout pattern, a netlist, and/or a tool process for an integrated circuit design, as will be discussed further below. At block 101, the process defines a space of configurations. At block 102, the process builds a graph structure, in which nodes are configurations, and edges link configurations to sub-configurations. At block 103, the process annotates each node in the graph with additional data. At block 104, the process computes analytical and statistical metrics on the graph. At block 105, the process searches the graph to identify a set of configurations meeting specific criteria. At block 106, the process replaces the set of configurations identified by search 105 to optimize specific criteria. At block 107, the process creates, through graph traversal, variants of the set of configuration identified by search 105 to optimize different criteria.

In an example to define a space of configurations, every configuration is assigned one and only one representation in the space. This one-to-one assignment allows a direct literal comparison of the representation to determine whether two configurations are equivalent. Furthermore, this assignment allows all configurations to be represented in this space.

In one embodiment, the process 100 may be used to determine a physical layout pattern for an integrated circuit electrical design. In such a case, the process 100 at block 101 may define a layout pattern configuration space, and the process 100 at block 102 may build a layout pattern configuration graph having a plurality of layout pattern configurations meeting a plurality of circuit requirements. The process 100 at block 103 may annotate at least two of the plurality of layout pattern configurations of the layout pattern configuration graph with characteristics. The process 100 at block 104 may compute analytical or statistical characteristics by analyzing sample layout patterns. The process 100 at block 105 may search for configurations by partitioning the integrated circuit electrical design into a plurality of circuit design configurations. The process 100 at block 105 may search for one of the plurality of circuit design configurations that meets one of the plurality of circuit requirements. The process 100 at block 106 may create, find, or select variants, such as selecting one of the plurality of layout pattern configurations from the layout pattern configuration graph. The selected one of the plurality of layout pattern configurations meets different criteria, such as the selected circuit requirements. The process 100 at block 107 may replace the first layout pattern configuration with the second layout pattern configuration in the physical layout pattern.

In another embodiment, the process 100 may be used to determine a netlist for an integrated circuit electrical design. In a further embodiment, the process 100 may be used to determine a tool configuration for a manufacturing process. The manufacturing process may be for the purpose of manufacturing an integrated circuit design, or for other products.

Advantageously, the configuration graph and related algorithms described herein are improved computing techniques that increase the performance of the computer system used for integrated circuit design. In addition, these algorithms are used to dramatically improve the integrated circuit design process.

Further details of the physical layout pattern embodiment set forth above in the discussion with respect to FIG. 1 are now provided with respect to FIGS. 2-5.

Figure 2:
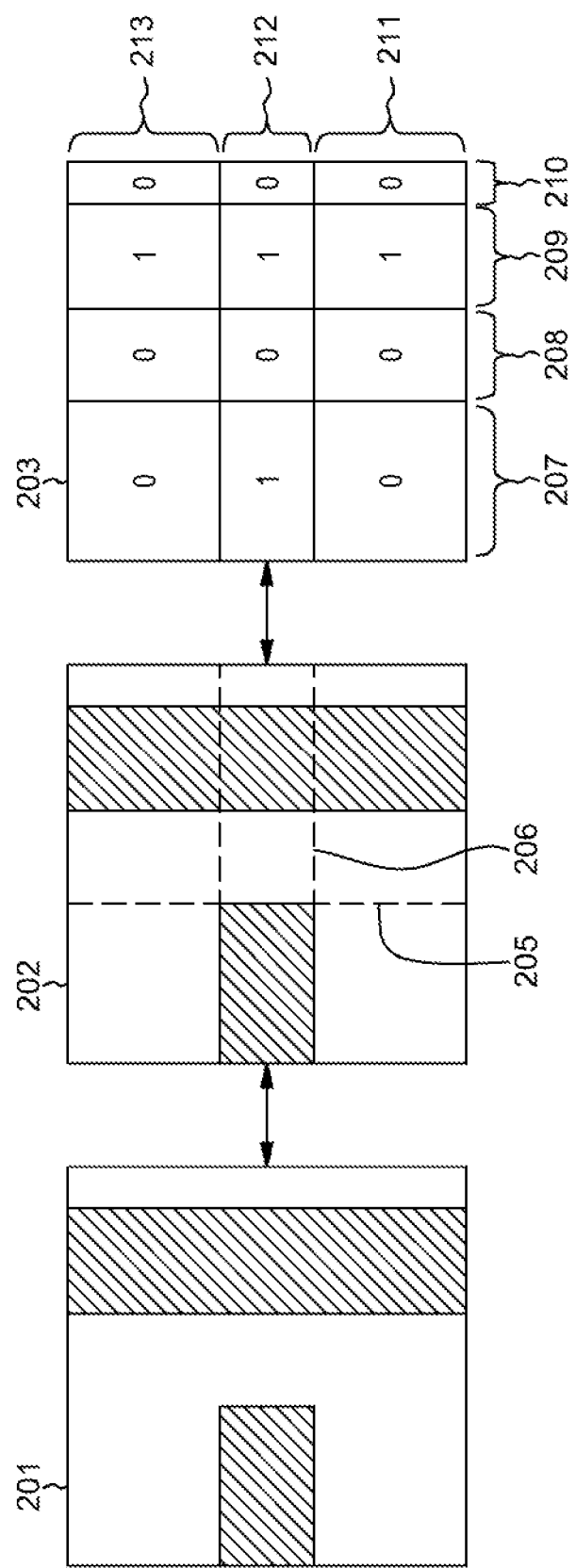
FIG. 2 illustrates defining an exemplary layout pattern configuration as a two-dimensional grid with rows and columns, in accordance with aspects set forth herein.

FIG. 2 is an exemplary illustration of a design configuration space defined for layout patterns in two dimensions, for which geometric edges are strictly horizontal or vertical. All geometric edges of exemplary layout pattern 201 are horizontal or vertical. In an example to construct a representation of the configuration, each horizontal and vertical edge may be extended to the pattern boundary to construct grid 202. Each grid cell is either completely filled, or completely empty. Next, each completely filled grid cell, is represented by a 1, and each empty grid cell is represented by a 0. The resulting 4 column by 3 row matrix 203 of 0's and 1's represents the topology of the configuration. The column widths of the matrix, 207, 208, 209 and 210, and the row heights of the matrix, 211, 212, and 213, represent the dimensions of the configuration. This procedure unambiguously constructs a unique configuration representation 203 for the layout pattern in 201.

The procedure may be reversed to construct the unique layout pattern in 201 from the exemplary configuration representation in 203. For example, a 4 column by 3 row matrix can be drawn with column widths 207, 208, 209, and 210, and row heights 211, 212, and 213. This forms a grid. Next, each cell of the grid can be filled if the corresponding matrix cell is 1, and left empty if the corresponding matrix cell is 0, resulting in grid 202. Finally, adjacent filled grid geometries can be merged together to construct the layout pattern in 201.

Together, the transformation procedures described above define an example of a configuration space, in which the exemplary layout pattern 201 has one and only one configuration representation 203. Using the same or similar procedures, any two dimensional layout pattern with horizontal and vertical edges is uniquely represented in this exemplary space as matrices of 0's and 1's with column widths and row heights.

Following the same approach as the previous examples, the transformation procedures can be simply extended to construct a design configuration space for multi-layered two dimensional layout patterns, for which all geometric edges are strictly horizontal or vertical, which is typically encountered in very large scale integrated circuit designs. This can be done by applying the procedures on a per-layer basis, and concatenating the results. Thus, the transformation procedures for constructing a design space enhance the computing architecture so that superior integrated circuit designs may be obtained.

Figure 3:
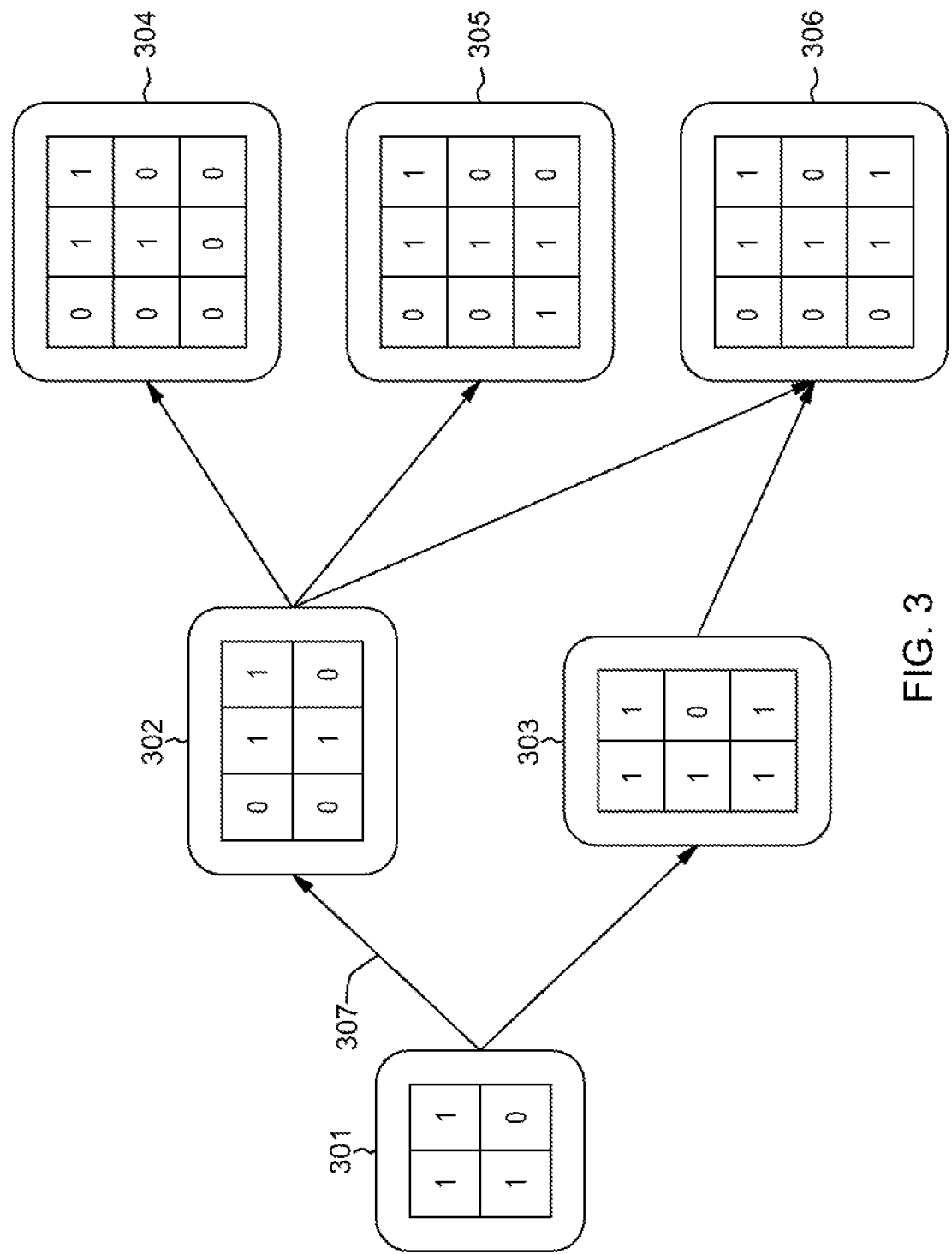
FIG. 3 illustrates associating an exemplary layout pattern configuration with a generalized layout pattern configuration and a specialized layout pattern configuration, in accordance with aspects set forth herein.

FIG. 3 is an exemplary illustration of associating an exemplary layout pattern configuration with a generalized layout pattern configuration and a specialized layout pattern configuration, for example, by building or creating a graph of configurations and sub-configurations within a design configuration space. Each node in graphs 301-306 is a design configuration represented as a matrix of 0's and 1's, similar to the matrix 213 of FIG. 2. For simplicity of illustration, column widths and row heights are not drawn. Furthermore, nodes are connected by directed edges from sub-configuration to configuration. For example, arrow 307 indicates an edge from node 301 to node 302. This indicates that node 301 is a sub-configuration of node 302, which is to say, the entirety of node 301 is contained in last two columns of node 302. The direction of the arrow is illustrative only, and can be reversed to point from configuration to sub-configuration without changing the result.

The graph edges describe the containment property. Because node 301 is a sub-configuration of node 302, every instance of node 302 must be an instance of node 301, but the converse is not necessarily true. Therefore, node 301 is a generalization of node 302, and conversely, node 302 is a specialization of node 301. The concept of generalization and specialization through traversal of graph edges becomes important during the search step 105 and variant generation step 106 of FIG. 1. This enhanced algorithm can be used to increase the speed at which the configuration space maybe searched so that superior integrated circuit designs may be automatically generated using the machine learning algorithms as explained in detail herein. These techniques improve the functioning of the processors, so that they can perform new searches and categorizations that are not available in traditional methods.

Figure 4:
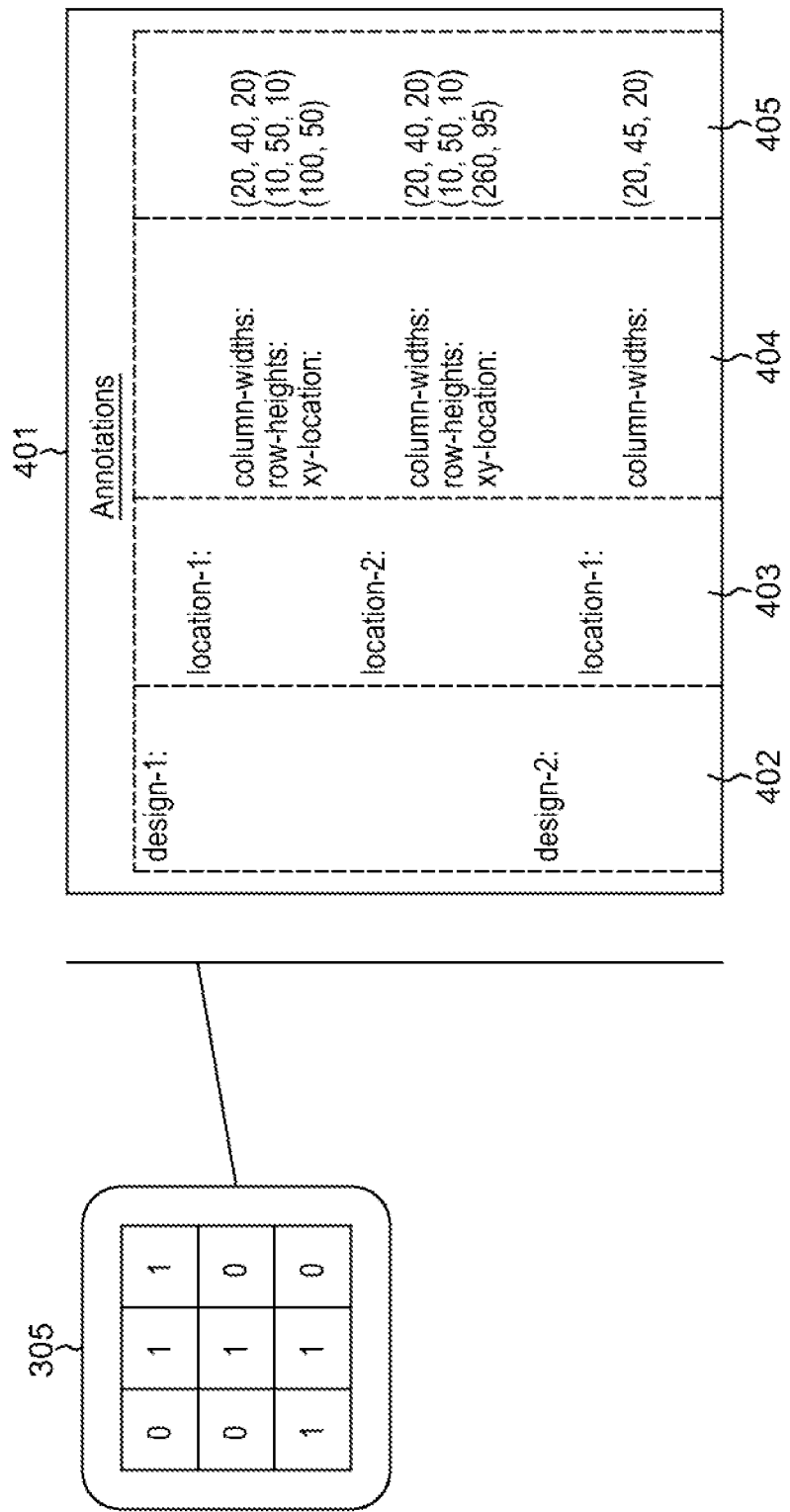
FIG. 4 illustrates annotating an exemplary layout pattern configuration of a layout pattern configuration graph with exemplary characteristics, in accordance with aspects set forth herein.

FIG. 4 illustrates annotating a layout pattern configuration of a layout pattern configuration graph with characteristics. In the illustrated example, annotations 401 have been attached to node 305, in the form of a hierarchical key-value database. The first level of keys 402 indicates which layout design the data is relevant to. In each design, for example, configuration 305 can appear in multiple locations. The second level of keys 403 indicates which location per design is being referenced. The third level of keys 404 indicates the specific data stored, in this case column-widths, row-heights, and xy-locations, per location, per design. Because configuration 305 is a 3 column by 3 row matrix, there are 3 column-width values, and 3 row-height values per data entry.

A key-value database is powerful in that it accommodates both wide a variety of data structures, and large quantities of data. Although, in this example, annotations 401 has 3 levels of keys in a single hierarchy, in general key levels numbering in the thousands with multiple hierarchies are possible. Other data storage options, including relational databases, object databases, graph databases and wide-column databases, can be used in place of, or in addition to the key-value database example presented here, depending on the quantity and structure of the annotated data. This represents a marked improvement in database functionality, and indeed such enhanced database techniques may be employed in other problem domains beyond integrated circuit design. Within the field of integrated circuit design, the provision of these new database techniques can improve design performance dramatically.

Figure 5:
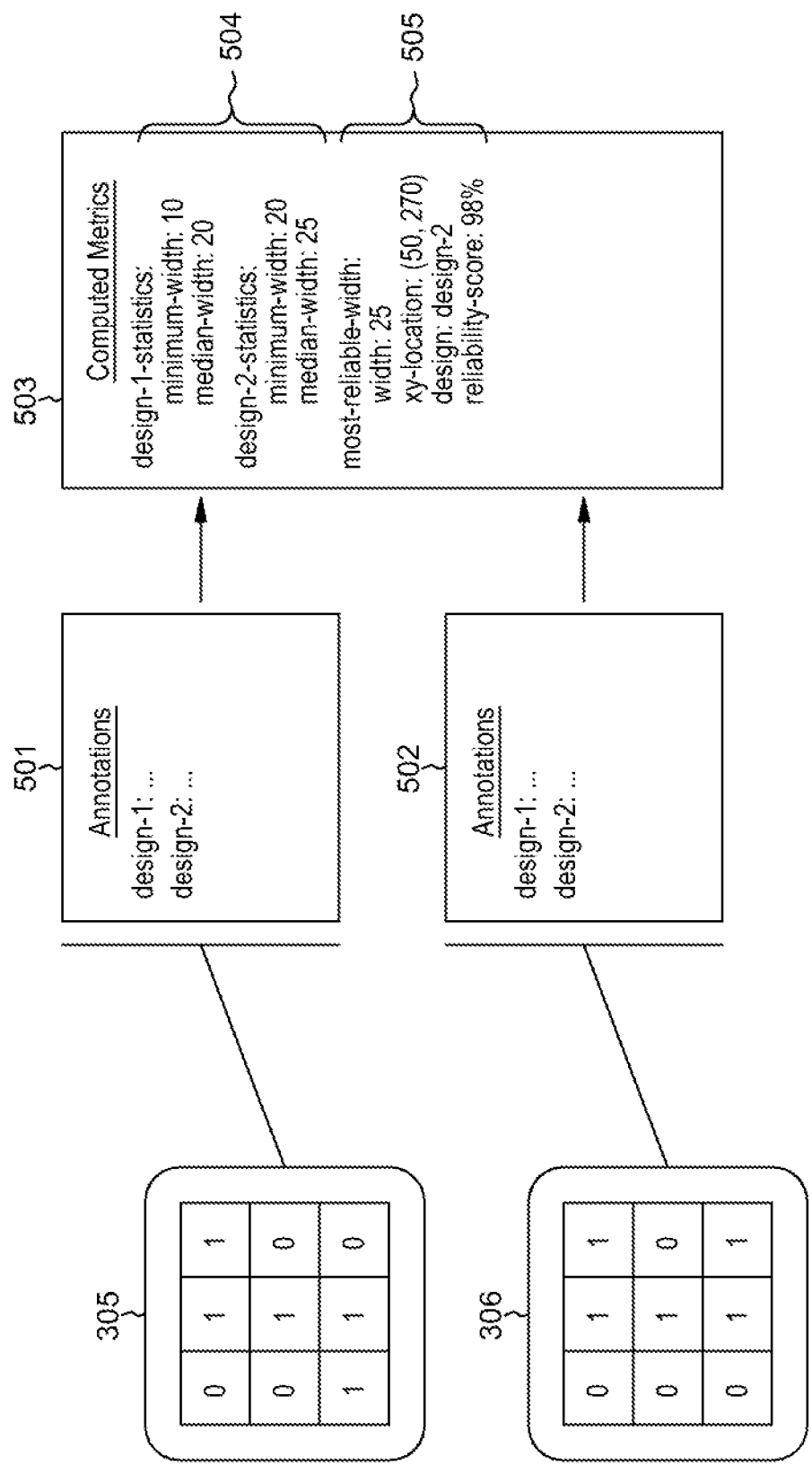
FIG. 5 illustrates annotating an exemplary layout pattern configuration of a layout pattern configuration graph with exemplary computed statistical and/or analytical metrics, in accordance with aspects set forth herein.

FIG. 5 illustrates annotating a layout pattern configuration of a layout pattern configuration graph with computed statistical and/or analytical metrics. In this example, metrics 503 are computed from node 305 with annotation 501, and node 306 with annotation 502. In general metrics can be computed on the entire graph or any subset of nodes thereof.

Examples of statistical metrics 504 include per design minimum-width and per design median-widths, computed from column-width annotations. Analytical metrics differ from statistical metrics in that they further identify meaningful patterns in the data. In this example, the concept of reliability and assessing what is most reliable is illustrated in the analytical metrics 505. Computed metrics 503 are stored in a key-value database for future search and retrieval. Other data storage options, including relational databases, object databases, graph databases and wide-column databases, can be used in place of, or in addition to the key-value database depending on the quantity and structure of the computed metrics.

Because all design layout configurations exist in a common space, it becomes possible to analyze the sub-space of all layout configurations appearing in one or more designs. In an example, it is possible to identify configurations appearing only in design-1, only in design-2, in both design-1 and design-2, and in neither design. For example, if design-1 is a well-characterized and well-yielding product, whereas design-2 is a newly created design, the set of configurations appearing only in design-2 is a quantification of the manufacturing risk associated with design-2.

In addition, it is possible to identify the sub-space of all layout configurations for which there is insufficient data to determine a computed metric. For example, it may be of critical interest to know which configurations do not have sufficient annotated data to determine a reliability-score value. The lack of reliability coverage identifies a quantifiable gap in knowledge, that may be filled, in an example, by acquiring more measurement data. As the data is acquired and annotated back into the graph, coverage is systematically improved, until it reaches 100% coverage, or an acceptable fraction thereof.

Figure 6:
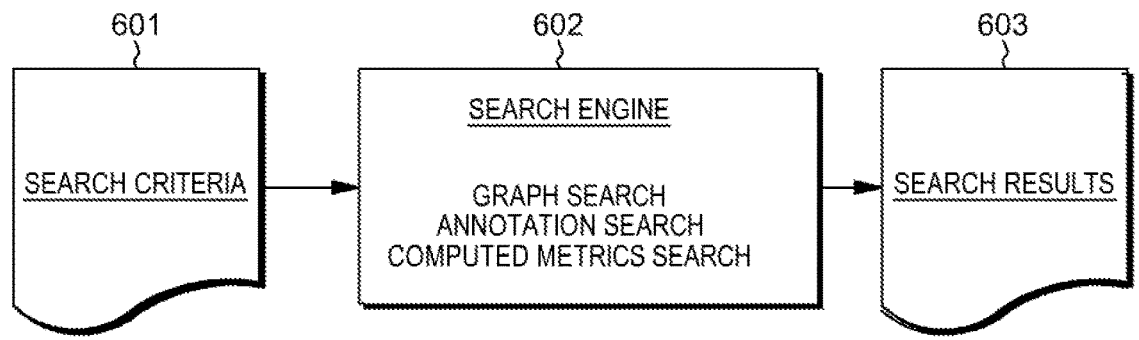
FIG. 6-7 are flowcharts depicting selection of a layout pattern from the layout pattern configuration graph, in accordance with aspects set forth herein.
Figure 7:
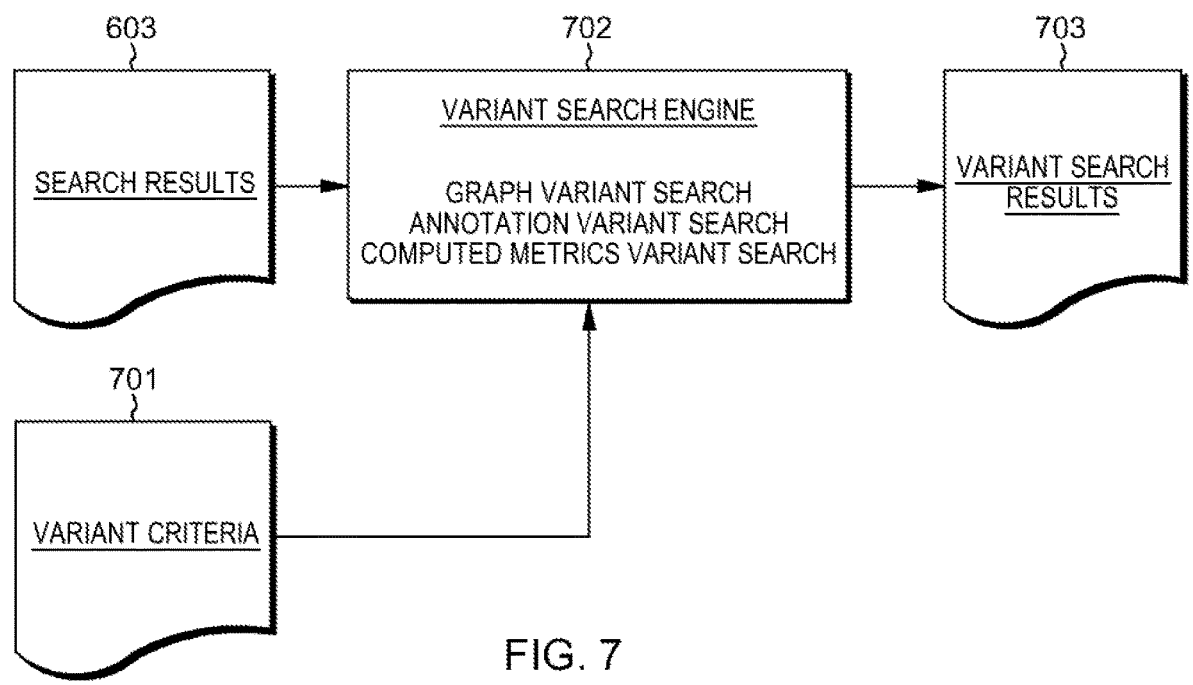
Figure 8:
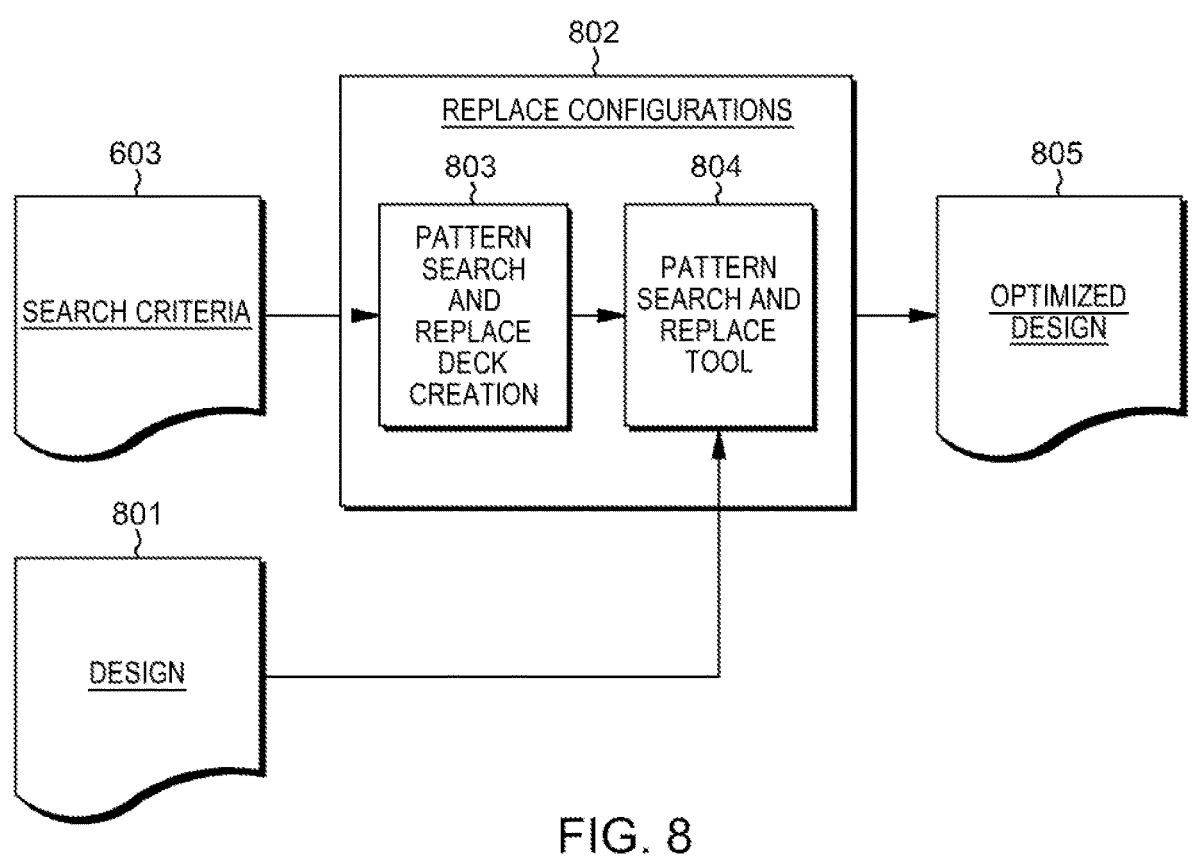
FIG. 8 is a flowchart depicting replacement of one layout pattern configuration with another layout pattern configuration in a layout pattern, in accordance with aspects set forth herein.

Further details of process 100 searching, selecting, and replacing configurations at blocks 105-107 (see FIG. 1), which are relevant to multiple embodiments (including, e.g., the physical layout pattern embodiment, the netlist embodiment, and the tool process embodiment) set forth above in the discussion with respect to FIG. 1 are now provided with respect to FIGS. 6-8. These enhancements to database and computing technologies are then employed to improve the integrated circuit design process.

FIG. 6 is a process flow diagram of a method to search for configurations meeting specific criteria. Search criteria 601 are provided as input to the search engine 602 which generates search results 603. In an example, criteria that can be searched for include, configurations and their generalizations of specializations, annotation keys and values, and metrics keys and values. Building on previous examples, some example search criteria are, "Find the four least reliable configurations in design-1; then find the most specialized configuration that generalizes all of them; then report on their xy-location data in design-1 and design-2." To execute this exemplary search, reliability, design-1, design-2, configuration, specialization, generalization, and xy-location are understood and implemented by the search engine. Specifically, configurations and their specialization and generalization may be implemented through graph search algorithms, such as breadth-first search, depth-first search, spanning-tree, and shortest-path search; design-1, design-2, and xy-location are key-values that can be found by searching through the annotation database; reliability is a value that can be found by searching the computed metrics database.

The concept of generalization and specialization in search is particularly useful to solve inference problems. Multiple observations on the graph may be linked by searching for a common generalization, i.e. searching for a sub-configuration that can explain the observations on multiple configurations. Conversely, if a set of observations seems noisy, or a strategy of improvement sometimes works, there may be hidden high-dimensional factors masquerading as noise. Searching for specialized examples may help to distinguish these hidden factors by adding context to the configuration.

Another application of search is the related concept of machine learning. Every search result can be used as a survey to assess the value of the returned result. These values can be used as input to a supervised machine learning algorithm to improve the value of future search results. For example, a generalization search result on lithography hotspots can be tested against a lithography simulator, to see if the generalization is useful, or overly pessimistic in predicting lithography hotspots. Similarly, a generalization search result on metrology defects can be tested against a defect scanner, to see if the generalization helps to find more defects, or produces more false alarms. This basic search and evaluate process can be used to drive improvements in any predictive model coverage of the design configuration space. Further, such a process represents improved capabilities in comparison to traditional techniques that simply use static libraries.

FIG. 7 is a process flow diagram of the method to create variants of configurations that optimize different criteria. The purpose is to augment the previous search results 603 with variations that serve different optimization purposes and therefore have different criteria. For example, some variant criteria are, "specialized variations of the configurations of the previous search results, but not in any design." The variant search engine 702 may accept as input previous search results 603, and any variant search criteria 701, generating the requested variations 703 as output. To implement the variant search engine, graph search, annotation search and compute metric search are each extended to accept a prior search result as input.

Although the process of creating variants is implemented in this method as a search process, the reason it can be implementable as such is because the search is built on a graph covering the entire configuration space, not just a graph covering an input data set. From the perspective of any input data set, a novel, previously unobserved variant has been created; but from the perspective of the configuration space, it is a realization of a configuration already in the space that was previously unrealized.

FIG. 8 is a process flow diagram for optimizing designs by replacing suboptimal design configurations with optimal ones. Sub-optimal configurations and their corresponding optimized replacement configurations are returned as search results 603. The sub-optimal configurations of an input design 801, is replaced by optimized configurations 802, resulting in an optimized design 805. In an example, the replacement is performed by converting the search results into a pattern search and replace deck 803. The deck is then forwarded to a pattern search and replace tool 804, with the input design 801, to produce an optimized design 805. Such pattern search and replace tools are widely available in the electronic design and automation industry.

Other embodiments of constructed configuration spaces, along with various details of each, such as annotation details, etc., are now set forth with respect to FIG. 918. As noted above, these other examples may make use of the same searching, selecting, and replacing algorithms described above with respect to FIG. 1. In addition to the layout pattern, netlist, and tool process examples already mentioned above, other potential configuration spaces include the space of integrated circuit manufacturing tool settings, such as temperature, exposure time, and concentration, and the space of electronic design automation tool configurations, such as command options, performance optimization options, and resource usage options.

In other examples, these techniques may be used to start with a conceptual design, define the electrical design, and feed into a fabrication process so that various fabrication tools are used to transform the conceptual design into a physical integrated circuit chip in a unified end-to-end process.

Figure 9:
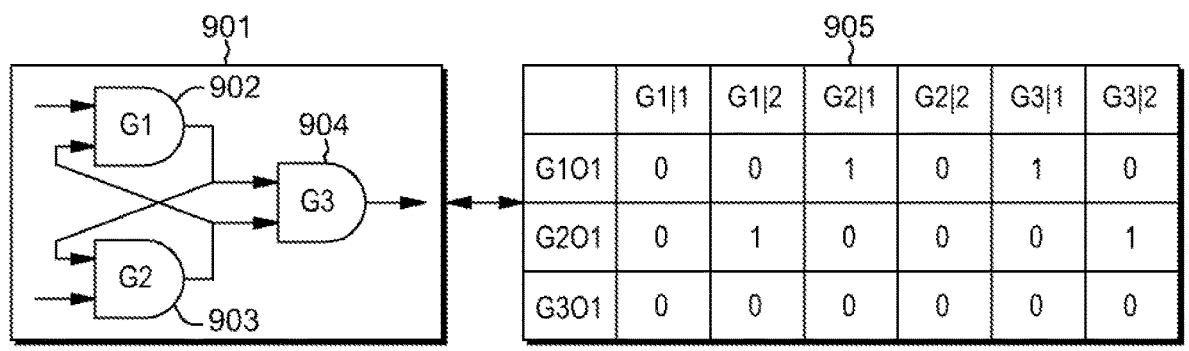
FIG. 9 illustrates defining a netlist configuration as a set of nodes having inputs connected to outputs, in accordance with aspects set forth herein.

FIG. 9 is an exemplary illustration of a design configuration space defined for a gate-level netlist, which describes the connectivity of an electrical network of gates. A netlist 901 consists of a network of wires connecting gates G1 902, G2 903, and G3 904. Each gate, has two inputs and one outputs. A wire connects each gate output to one or more gate inputs following the direction of the arrows. As an example, this connectivity can be represented instead in matrix format 905 where rows represent gate outputs, and columns represent gate inputs. Rows G101, G201, and G301, denote "gate G1 output 1", "gate G2 output 1", and "gate G3 output 1" respectively. Columns G111, G112, G211, G212, G311, and G312 denote "gate G1 input 1", "gate G1 input 2", "gate G2 input 1", "gate G2 input 2", "gate G3 input 1", and "gate G3 input2" respectively. A "1" in the matrix indicates a wire connection from the given row output to the given column input, and a "0" indicates no wire connection. In netlist 901, G1 output 1 is connected to G3 input 1. In the matrix 905, row G101 column G311 contains a "1". In this way, the matrix represents any possible connections between G1, G2, and G3, so defines an example configuration space of a netlist of these three gates.

Figure 10:
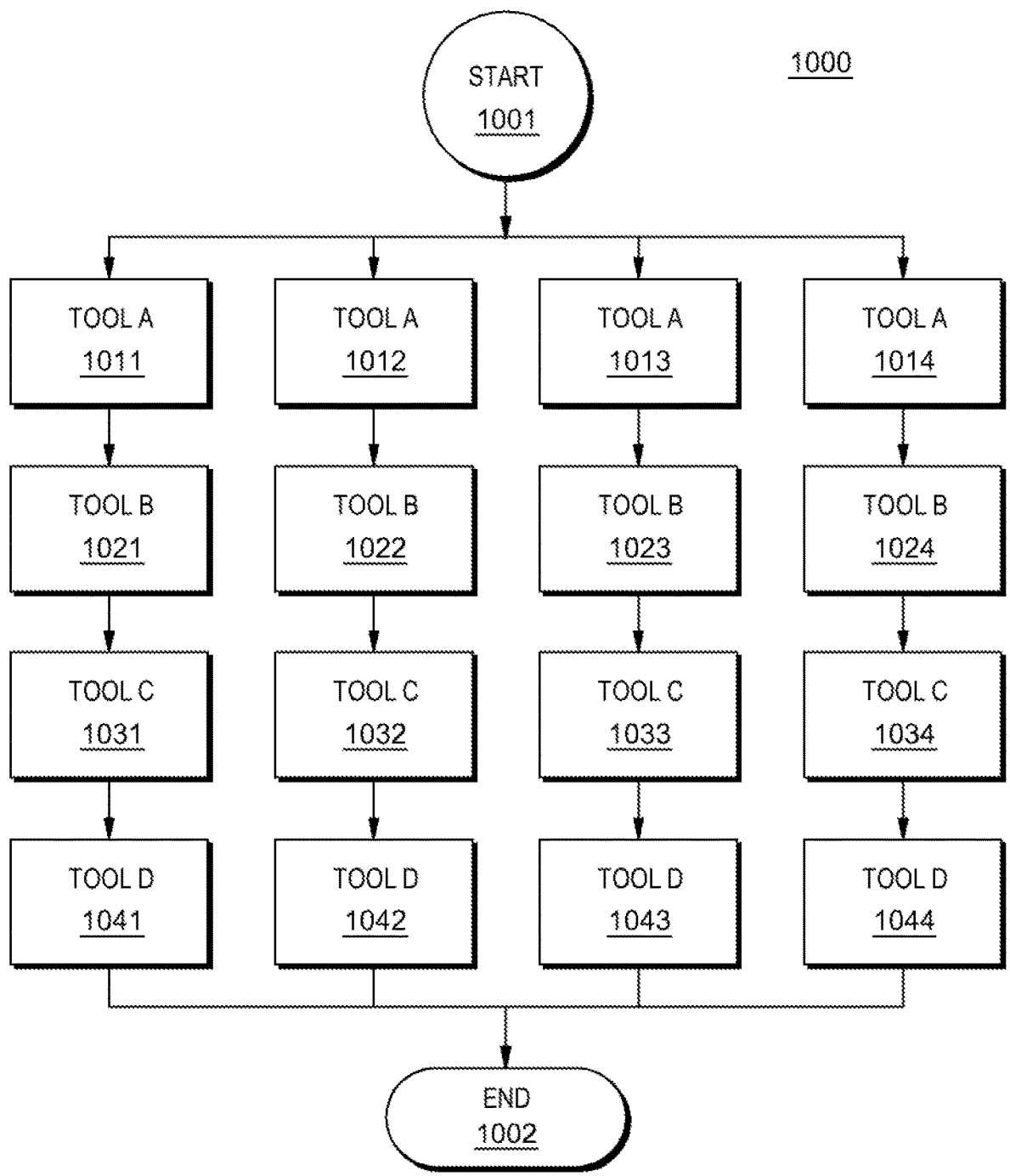
FIG. 10 illustrates defining a tool configuration of a manufacturing process as a sequence of tools in which each tool completes a step of the manufacturing process, e.g., for fabricating an integrated circuit, in accordance with aspects set forth herein.

FIG. 10 is an exemplary illustration of a configuration space defined for a complex multi-step manufacturing process, where different tools are needed to complete each step. As shown, the exemplary manufacturing process requires 4 different types of tools, Tool A, Tool B, Tool C, and Tool D. There are 4 tools available for each type: Tool A 1011, 1012, 1013, and 1014; Tool B 1021, 1022, 1023, and 1024; Tool C, 1031, 1032, 1033, 1034; and Tool D 1041, 1042, 1043, and 1044. The exemplary manufacturing process requires that each type of tool must be used once, in alphabetical order, from start 1001 to end 1002. A tool configuration, e.g. 1011, 1022, 1033, 1044, is a sequence of tools from start to end that meets the manufacturing process requirement. The set of all possible tool configurations forms the configuration space. In this example, manufacturing process requires a fixed sequence of tools, i.e. from Start to Tool A to Tool B to Tool C to Tool D and ends; but in other examples of complex manufacturing processes, the sequence of tools or a portion of the sequence of tools can be interchangeable, some tools may be used more than once in a sequence, and some tools may have multiple chambers of operation.

Figure 11:
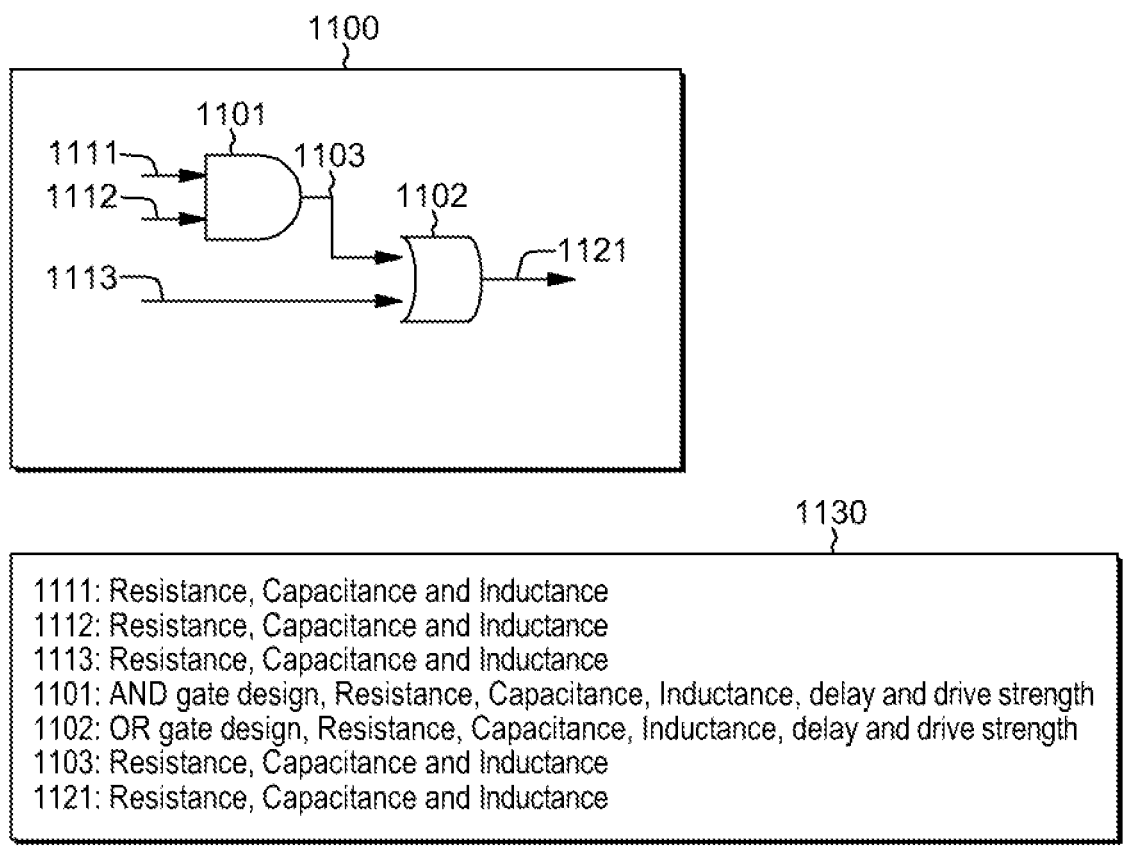
FIG. 11 illustrates annotating a netlist configuration graph, in accordance with aspects set forth herein.

Similar to the netlist example depicted in FIG. 9, FIG. 11 is an exemplary illustration of a graph node annotation process, where nodes represent gate-level netlist configurations 1101. Annotation for gates 1102, 1103 include gate design, resistance, capacitance, inductance, delay and drive strength. Annotation for wire connections include resistance, capacitance, and inductance.

Figure 12:
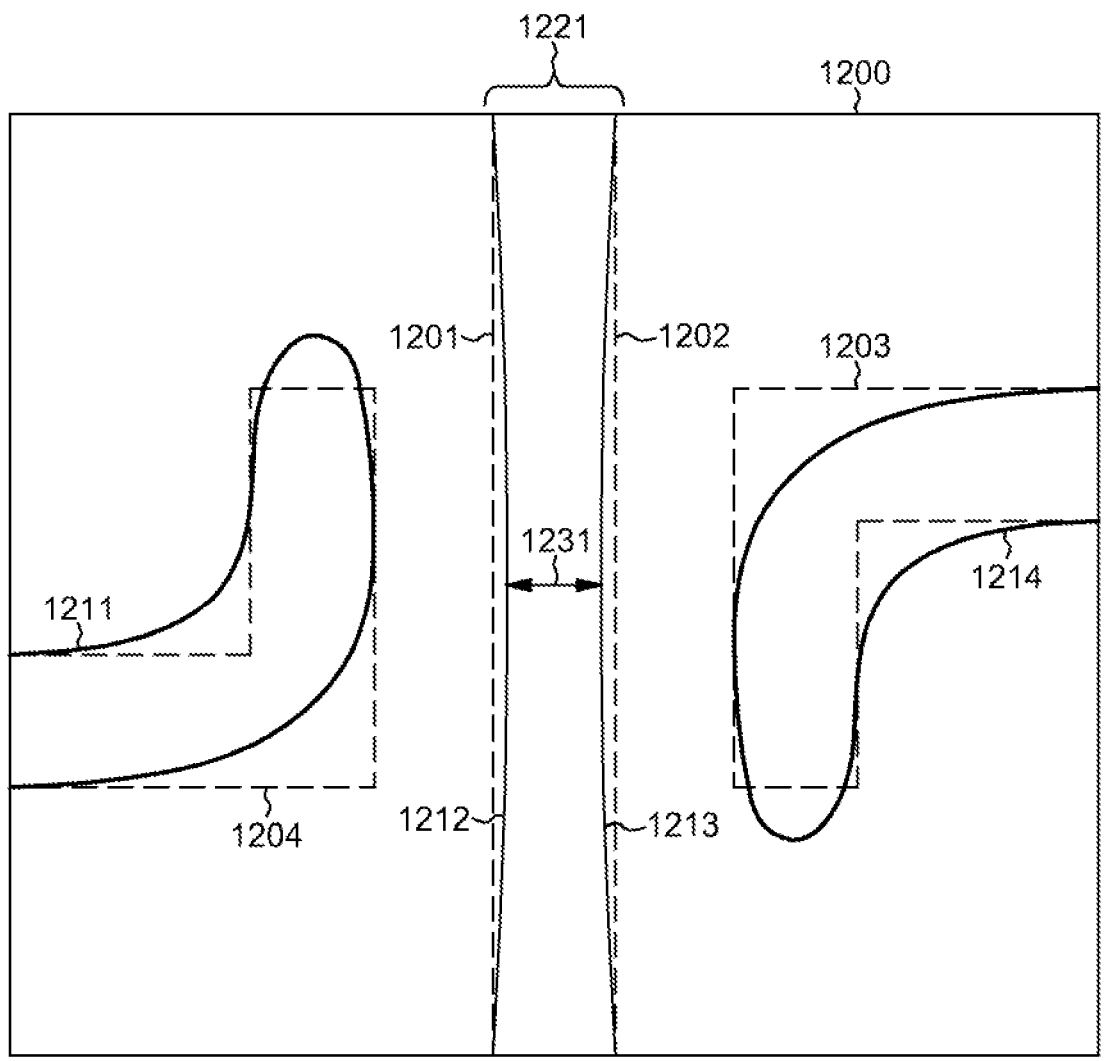
FIG. 12 illustrates an exemplary design layout configuration and simulated or fabricated interconnect portion, in accordance with aspects set forth herein.

FIG. 12 illustrates an exemplary design layout configuration and simulated or fabricated interconnect portion. As shown, layout configuration 1200 includes geometries 1201 through 1204 with physical dimensions such as lengths and widths. Due to effects of the manufacturing process, the fabrication or simulation of the geometries results in printed contours 1211 through 1214, that differ from the original geometries. If the differences of printed contours excessively distort the design, then it is labeled as a potential manufacturing hotspot. Hotspots information from different modes of analysis can be annotated onto the layout design configuration.

One example of hotspot information that can be annotated onto the layout design configuration is the critical dimension of the fabricated or simulated geometric element 1231, where is differs sufficiently from the original intended width of 1221. The critical dimension can be measured using model based simulation or using measurement tools on a semiconductor wafer.

Another example of hotspot information that can be annotated onto the layout design configuration is from the result of a failure analysis where an advance physical analysis such as a cross-section is perform on suspected hotspot to confirm 3-dimensional manufacturing issues.

Another example of hotspot information that can be annotated onto the layout design configuration is from the result of scan chain diagnosis. Scan chain diagnosis can detect semiconductor manufacturing failures such as synchronous timing failure or electrical failure such as resistance, capacitance or inductance value differ from the original intent or electrical model. These failure mechanisms can be annotated onto the layout design configuration where the hotspot occurs.

FIG. 13 illustrates in table form exemplary graph annotations from a DSA-friendly library. Row 1301 describes the key components of graph annotation for DSA: configuration, pattern, and DSA-associated annotations, which is exemplarily composed of pattern characteristics, DSA approaches and guiding patterns. Row 1302 illustrates the graph annotation for a 1×7 configuration 1306, with which the pattern 1307 is associated. Panel 1308 describes the pattern characteristics, such as directionality, periodicity p, applicable layers. Panel 1309 illustrates the applicable DSA approaches and associated DSA guiding patterns with dimensional constraints. In this case the grapho-epitaxy requires a guiding pattern separated by 3p, while the chemo-epitaxy requires a guiding pattern with pitch value of 2p. Row 1303 illustrates the graph annotation for the same configuration as in Row 1302 but a different pattern. In this case the pattern presents two pitch values, p1 and p2, and the corresponding DSA approach and guiding patterns change. Row 1304 illustrates the graph annotation for a 3×8 configuration, where a s-shaped jog is present between two parallel lines, which gives rise to a 2-directional pattern. Row 1305 illustrates the graph annotation for a 3×7 configuration with which a pattern of three squares with periodicity p is associated. In this case, the applicable layers change to contact-hole-like layers such as contacts and vias.

FIG. 14 illustrates in table form exemplary graph annotations from a multiple-patterning-friendly library. Row 1410 describes the key components of graph annotation for multiple-patterning: configuration, pattern, and multiple-patterning-associated annotations, which is exemplarily composed of pattern characteristics and multiple-patterning strategies. Row 1411 illustrates the graph annotation for a 3×7 configuration 1414, with which the pattern 1415 is associated. Panel 1416 describes the pattern characteristics, such as directionality, periodicity (p), minimum common run length, odd cycle information, and applicable layers. Columns 1417 describes the readiness of applying specific multiple patterning strategies, such as lithography-etch-lithography-etch (LELE), lithography-etch-lithographyetch-lithography-etch (LELELE), self-aligned double patterning (SADP), self-aligned quadruple patterning (SAQP), to resolve pattern 1415. Row 1412 illustrates the graph annotation for the same configuration as in Row 1411 but a different pattern. In this case the minimum common run length is only 10 nm and may cause hotspot during a key processing step using cut mask for self-aligned patterning, therefore the SADP and SAQP strategies are not applicable. Row 1413 illustrates the graph annotation for configuration 1418. In this case, the pattern presents an odd cycle and hence LELE is not an applicable multiple patterning strategy.

Figure 15:
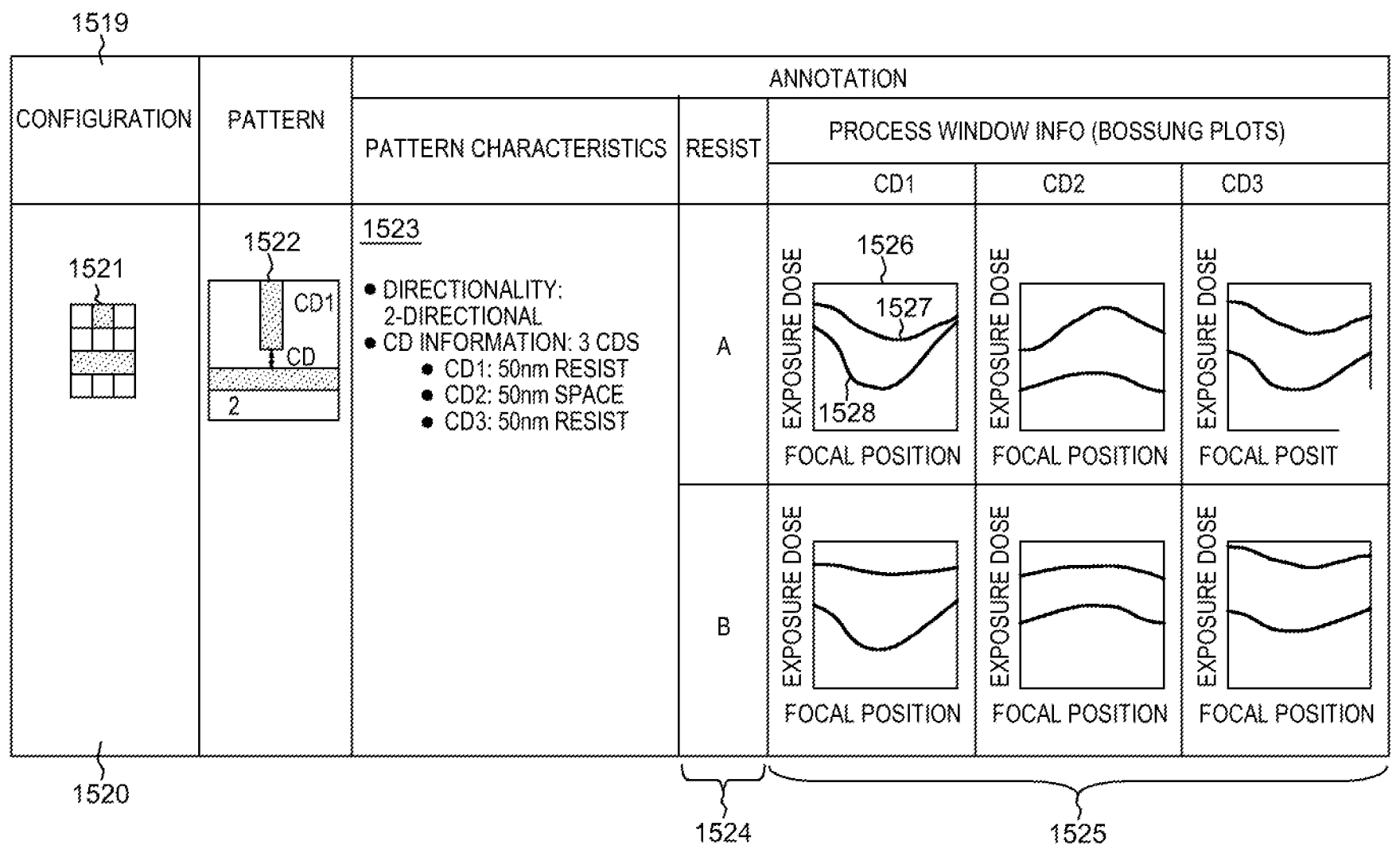

FIG. 15 illustrates in table form exemplary graph annotations from Focus-Exposure Matrix (FEM) analysis result: Row 1519 describes the key components of graph annotation for FEM analysis result: configuration, pattern, and FEM analysis-associated annotations, which is exemplarily composed of pattern characteristics, resist information, and process window information. Row 1520 illustrates the graph annotation for an exemplary 4×3 configuration 1521, with which the pattern 1522 is associated. Panel 1523 describes the pattern characteristics, such as directionality and CD information. Column 1524 indicates the related information on photoresists used in FEM analysis. Columns 1525 illustrates the Bossung plots for CD1 through CD3 with respect to the resist indicated in 1524. Bossung plots of data other than CDs can also be annotated, such as resist loss and resist sidewall angle. In a typical Bossung plot 1526, data on Exposure dose or Exposure latitude is plotted against Focal Position for a specific feature such as CD1. The specifications of CD1, such as target CD+/−10%, yield two boundary lines 1527 to define the region 1528 to quantify process window.

Other useful configuration node annotations for the integrated circuit design and manufacturing include: design intellectual property (P) source, name, and version; compute resource usage associated with processing the configuration with electronic design automation software; optical proximity correction optimized mask shapes; electrical characteristics such as resistance, capacitance, inductance; and timing characteristics such as delay.

Figure 16:
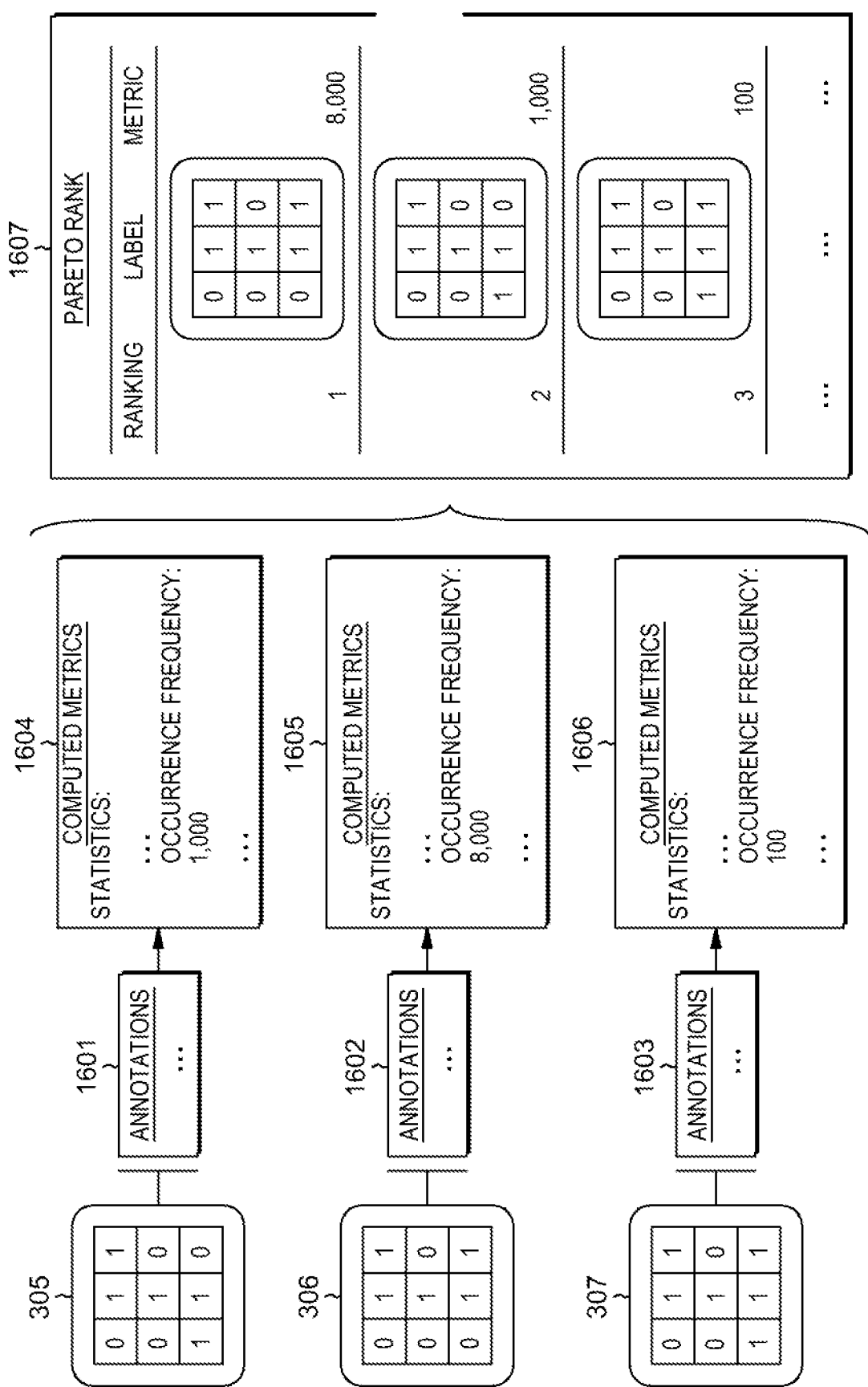
FIG. 16 illustrates annotating a layout pattern configuration graph using a Pareto Rank, in accordance with aspects set forth herein.

FIG. 16 illustrates process of using annotated node data to create a Pareto chart, in which nodes are presented and ranked by a metric in descending order. In this example, a plurality of nodes including 1605, 1606, 1607, are annotated and analyzed. As one of the computed metrics, the occurrence frequency, or counts of locations, can be used to construct a Pareto 1607 which sorts the nodes from high to low based on frequency. In general, the label of the Pareto is customizable, meaning that the label can be but not limited to the nodes, where other examples of the label include dimensional variances of a node, dimensional variances across multiple nodes, and dimensional variances across multiple nodes across multiple spaces. In general, the metric is also customizable, which can include but is not limited to statistical metrics such as occurrence frequency, probability, and Kullback-Leibler divergence and analytical metrics such as reliability-score.

Figure 17:
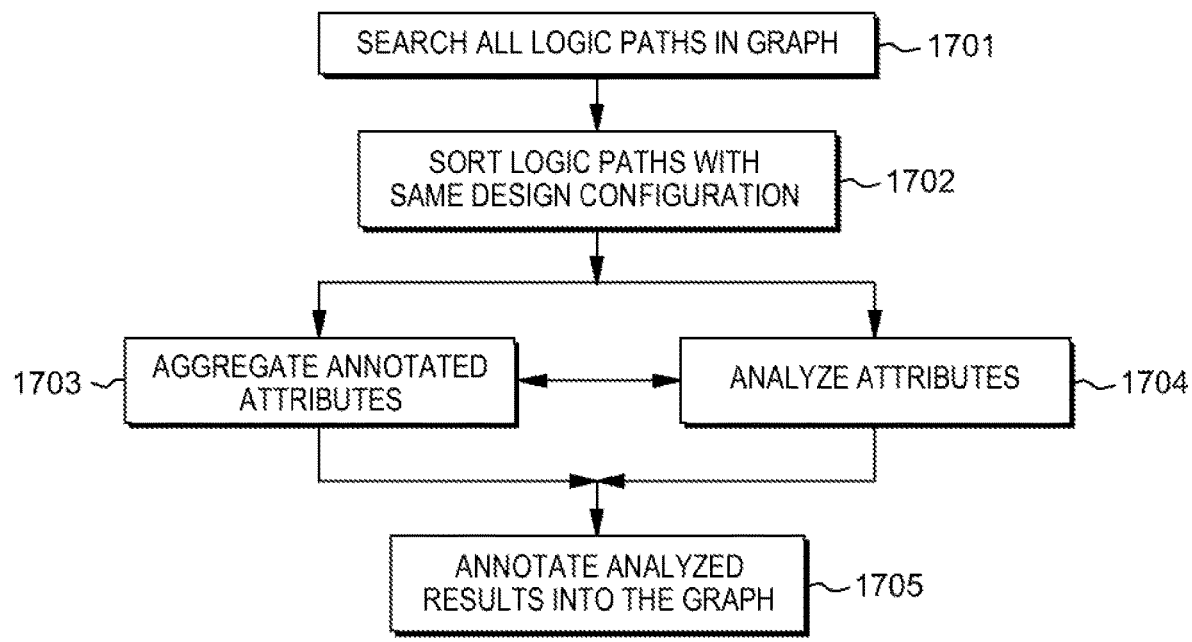
FIG. 17-18 are flowcharts depicting building a netlist configuration graph and selection of a netlist configuration from the netlist configuration graph for a gate level netlist, in accordance with aspects set forth herein.

FIG. 17 illustrates a process flow diagram to analyze attributes associated to a design configuration space defined for a gate level netlist. In this example, block 1701 searches the graph for all logic paths of interest for analysis. Block 1702 will sort the search results according to those with the same design configuration, where an example is to have the data sorted to have the same series of logic gate type and drive strength, but the net resistance, capacitance and inductance at the input or output pin or logic gate may be different. This method of sorting is to analyze the difference variations of net resistance, capacitance and inductance which were previously annotated onto the design configuration space as attributes. The sorted attributes can then be aggregated together 1703 for statistical analysis or for other method of analysis 1704. The result of the analysis can then be annotated back into the graph 1705.

Figure 18:
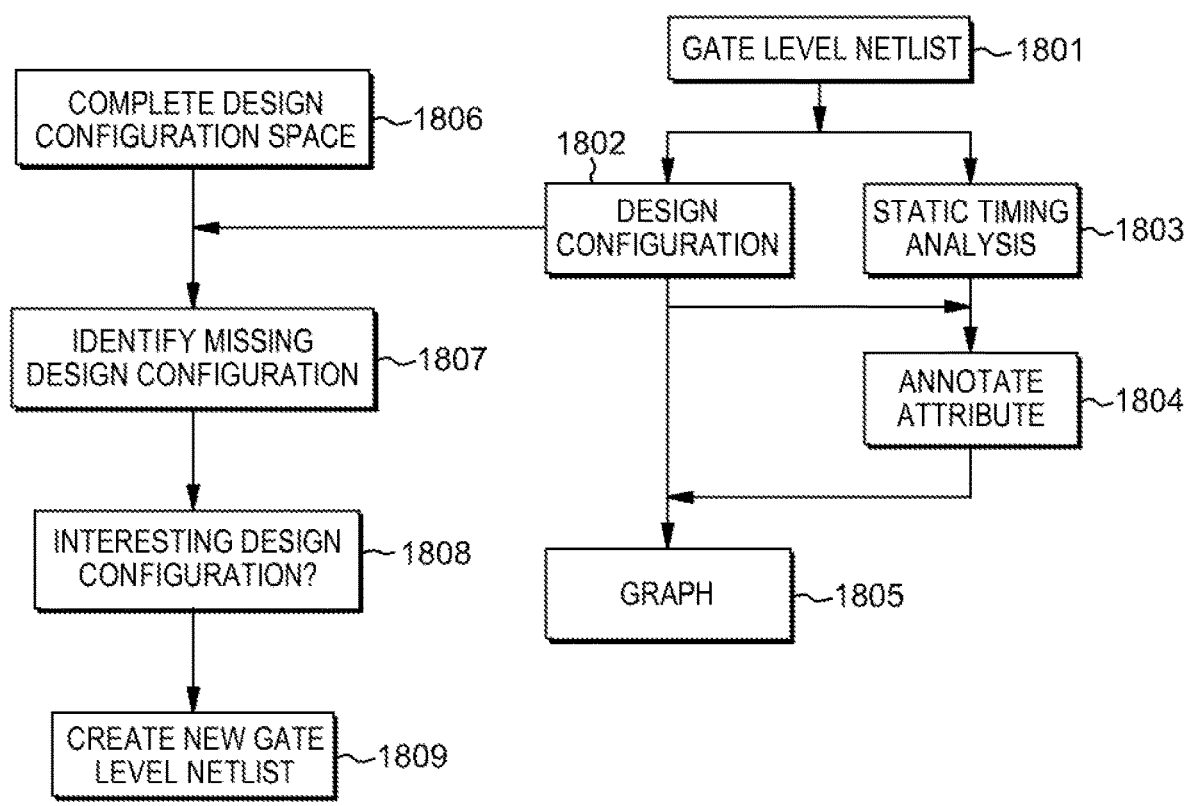

FIG. 18 illustrates a process flow diagram to acquire new data by creating new variants of a gate level netlist in a design configuration space. A gate level netlist 1801 is broken down to each unique design configuration space 1802, and then a graph is constructed 1805. Static timing analysis (STA) 1803 is run on the gate level netlist, and the attributes from the STA are then associated with the corresponding design configuration, and then annotated into the nodes in the graph 1804. When a complete design configuration space is available 1806, a comparison can be performed with the present design configuration 1802 to identify missing design configuration 1807. If the missing design configuration is of interest, value or to cover the complete space 1808, then a new gate level netlist can be created 1809. The new gate level netlist 1809 can be used in place of the existing gate level netlist 1801. for running through STA 1803, and to annotated attributes 1804 gather from STA with the corresponding design configuration, and appended onto an existing graph 1805. Although this example uses gate level netlist with static timing analysis as an example, but the methodology is not limited to this application.

Figure 19:
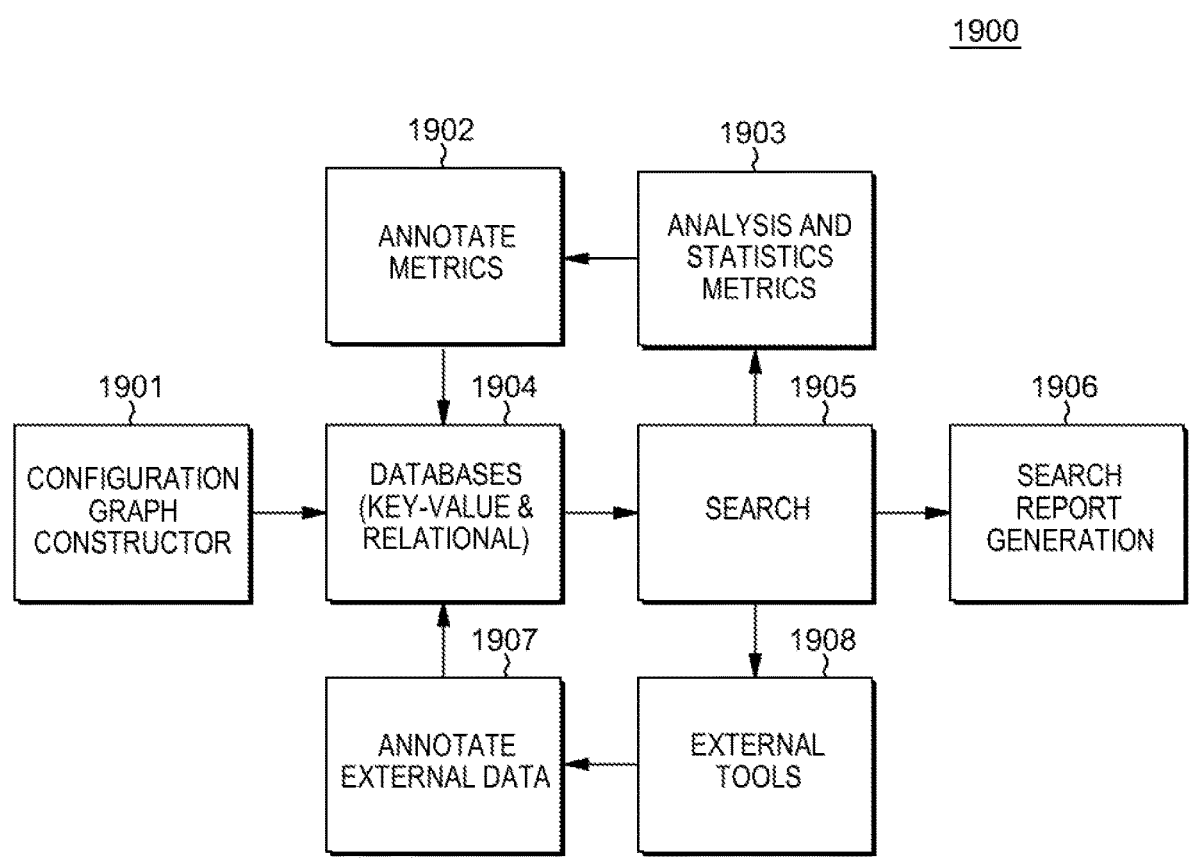
FIG. 19 is a block diagram of an exemplary computer system that implements an integrated circuit design method, in accordance with aspects set forth herein.

FIG. 19 is a block diagram of an integrated circuit design system 1900. The system 1900, which may be configured to execute program instructions to perform the steps of process 100 (FIG. 1), consists of: a computer program or subroutine to construct a graph of all configurations 1901; a computer program or subroutine to link computed metrics with the graph 1902; computer programs or subroutines to compute analytic and statistical metrics 1903; multiple databases to store the graph, to store annotated node data, and to store computed analytic and statistical metrics 1904; a computer program or subroutine for combined graph search, annotation search and computed metrics search 1905; a computer program or subroutine for search report generation 1906; a computer program or subroutine to link external data with the graph as annotations 1907; and a computer program or subroutine to interface with external tools such as electronic design automation software, metrology tools, and manufacturing tools 1908. The entire system 1900 may be implemented as a one or more computer programs, stored on one or more memories, and executing one or more processing units.

FIGS. 20A-20E present an embodiment for designing or optimizing an integrated circuit with target characteristics using a physical design configuration graph. For instance, the physical design configuration graph, which may be stored in a database, can include various physical design sub-configurations for placement of physical cells in an integrated circuit physical design.

Figure 20A:
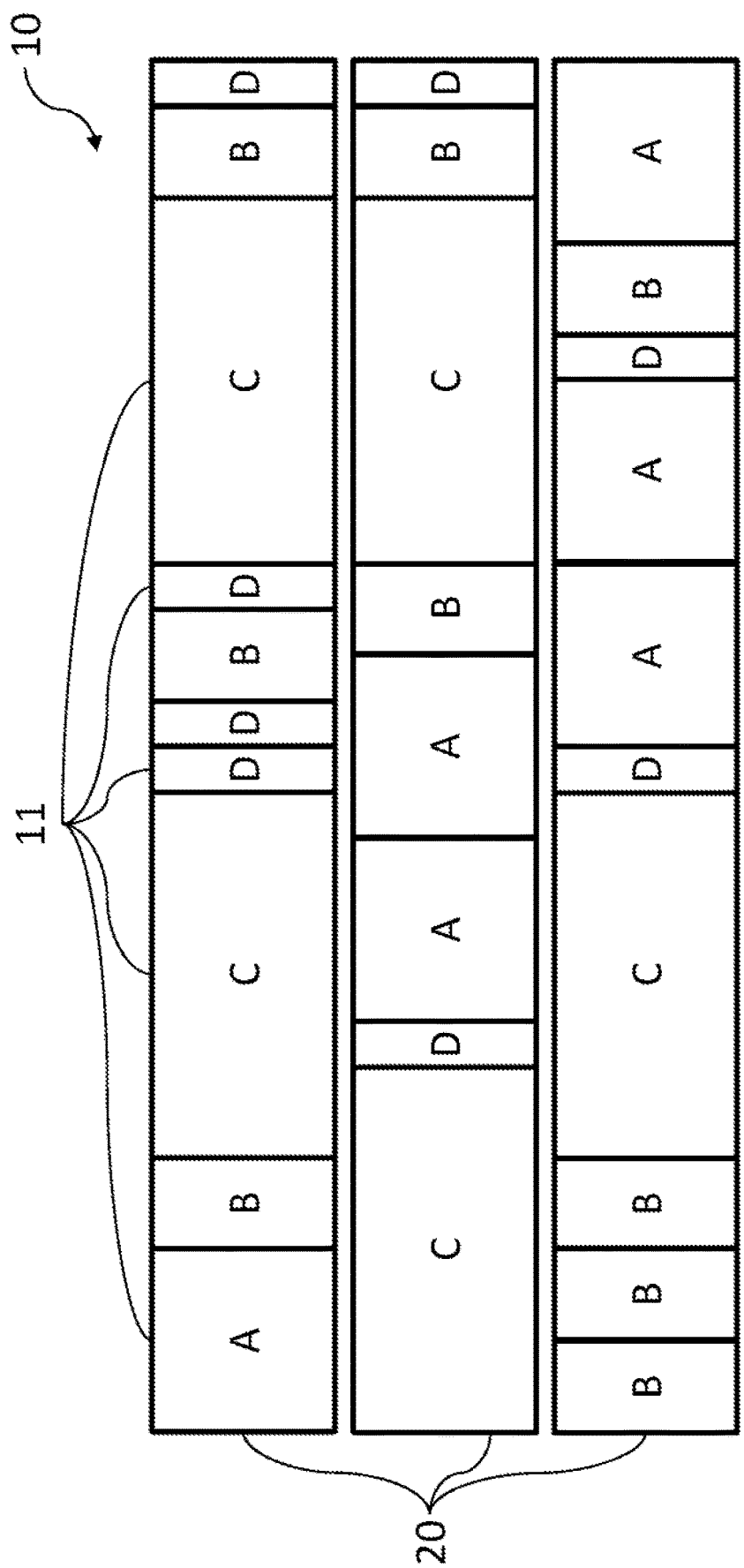
FIG. 20A depicts a portion of an integrated circuit physical design, in accordance with aspects set forth herein.

FIG. 20A depicts a portion of an integrated circuit physical design 10. As illustrated, the physical design 10 includes a number of cells or physical cells 11, such as one or more cells A, B, C, D. The cells 11 are arranged in a placement such that the order of the letters in each row determines the linear placement, and several rows 20 are placed vertically to form a two-dimensional block. As may be envisioned, more of the cells 11 may be included in a third direction so that a three-dimensional block of cells is created. In this example, all of the cells 11 are of one of four types, cells A-D. In another example, more than four types of cells may be present. The cells 11 may represent logic compute elements such as gates, passive electrical structures such as capacitors, active electrical structures such as diodes, or manufacturing assistance structures such as fill.

Figure 20B:
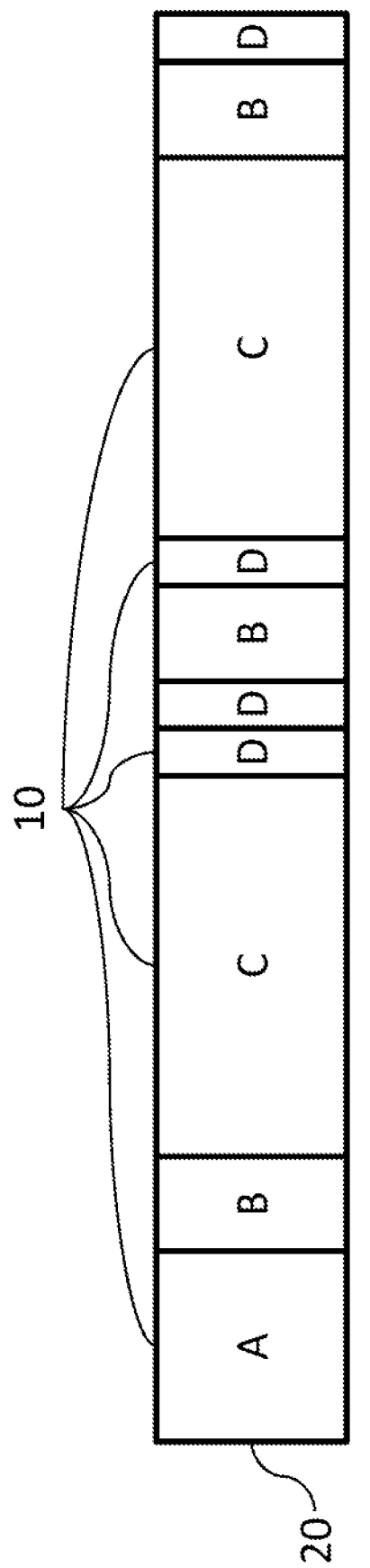
FIG. 20B depicts a physical design sub-configuration, in accordance with aspects set forth herein.

FIG. 20B depicts annotated characteristics 40 of one physical design sub-configuration or row 20. As noted in the tabular portion of FIG. 20B, each of the cells is further described in terms of its two-dimensional size, such as by a width and a height. In one example, annotations may include physical characteristics, such as orientation, magnification, and layers. In another example, annotations may include logical characteristics such as function, inputs, and outputs. In another example, annotations may include passive electrical characteristics such as capacitance, impedance and inductance. In another example, annotations may include active electrical attributes such as drive current, leakage, delay and operating voltage. In another example, annotations may include manufacturing characteristics such as density, redundancy and manufacturability scoring. In another example, annotations may include errors and warnings found within the cell. In another example, annotations may include other characteristics intrinsic to the cell. Cells may be chosen for the design of an integrated circuit based on these annotated characteristics meeting one or more required design criteria, such as, for example, a logical AND function operating at 0.6V with 10 ps delay and no errors. In a case where more than one cell meets the required criteria, a more optimal cell may be chosen to replace a less optimal cell based on one or more optimization criteria, such as, for example, smaller width, better manufacturability score, and fewer warnings.

Figure 20C:
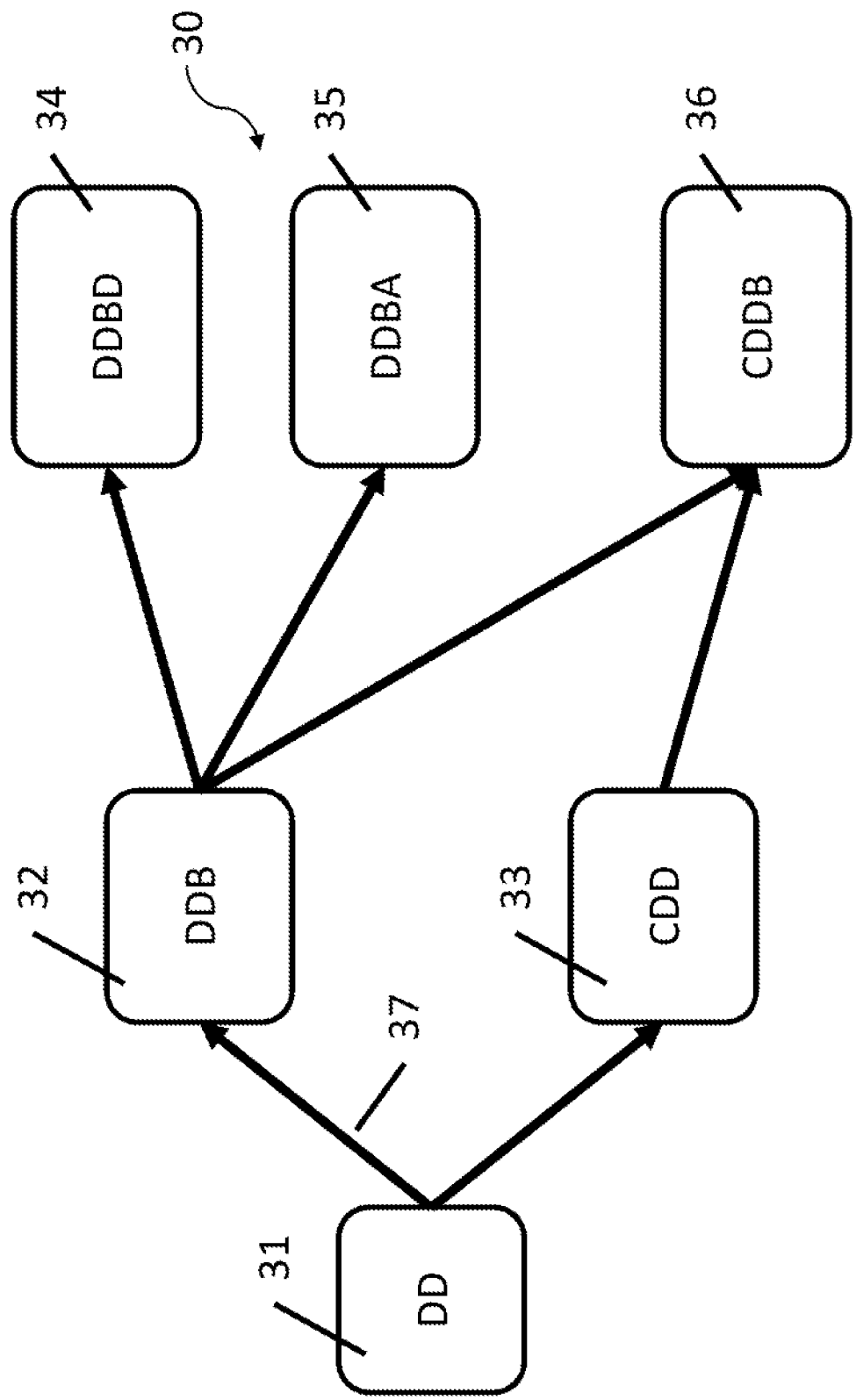
FIG. 20C depicts a physical design graph, in accordance with aspects set forth herein.

FIG. 20C depicts a physical design graph 30. As depicted, graph 30 includes nodes, and each node is a physical design sub-configuration 31-36. Each of the plurality of physical design sub-configurations 31-36 includes a placement of a group of physical cells 11 (see FIG. 20A). In one example, integrated circuit electrical design may be partitioned into a plurality of electrical design sub-configurations. In such a case, one of the electrical design sub-configurations can require a specific group of the physical cells 11, such as sequence DDBD, DDBA, or CDDB. Taking CDDB as an example sub-configuration, the requirement for a CDDB sub-configuration 36 can be met by using a DDB sub-configuration 32 or a CDD sub-configuration 33. Either of those sub-configurations may be preferred depending on the annotated characteristics that are known in the database.

Edges or associations 37 connect associated physical design sub-configuration nodes 31-36. These associations 37 are based on super-configuration/sub-configuration relationships, as DDB is a super-configuration of DD (and DD is a sub-configuration of DDB), allowing a required DDB structure to be built up starting with a DD structure.

Figure 20D:
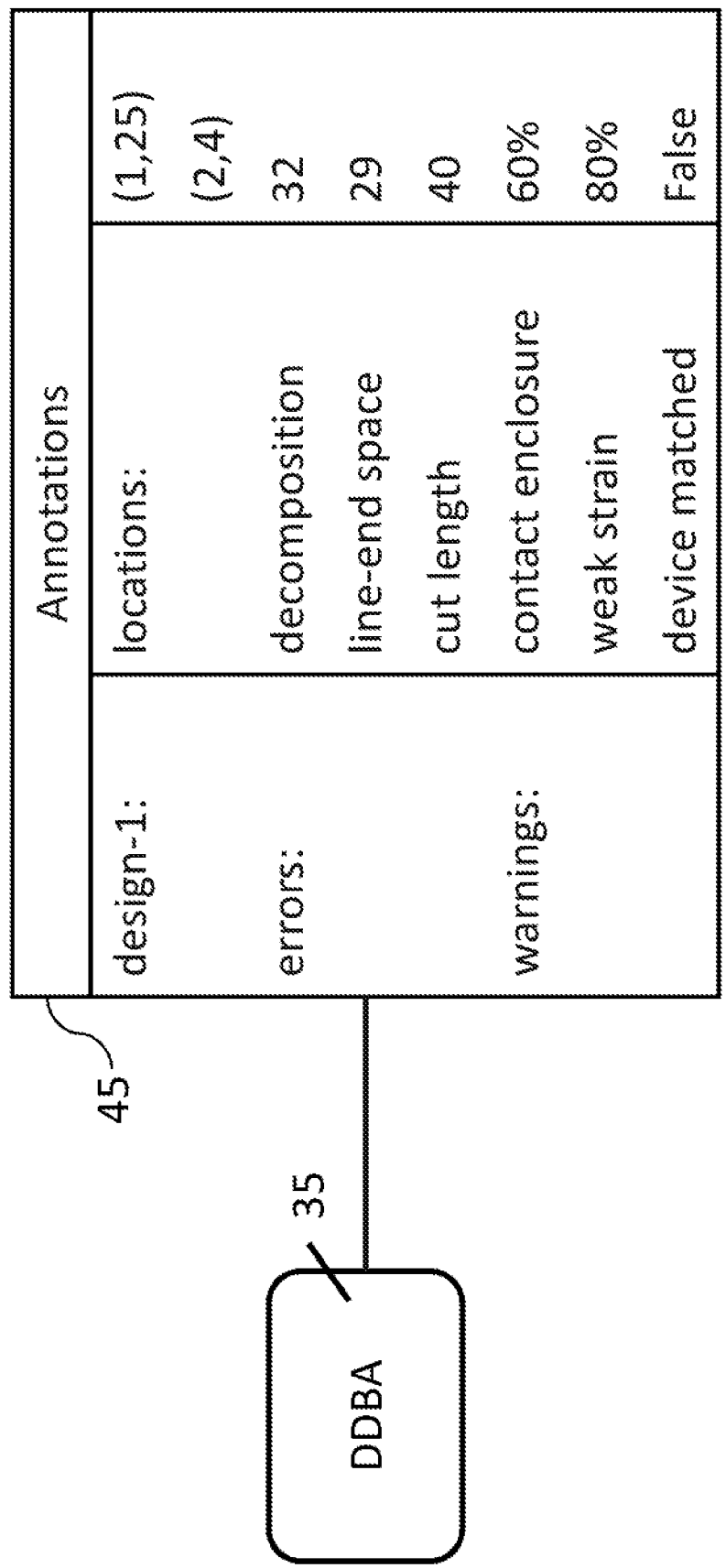
FIG. 20D depicts annotations of physical design sub-configurations of a physical design graph, in accordance with aspects set forth herein.
Figure 20E:
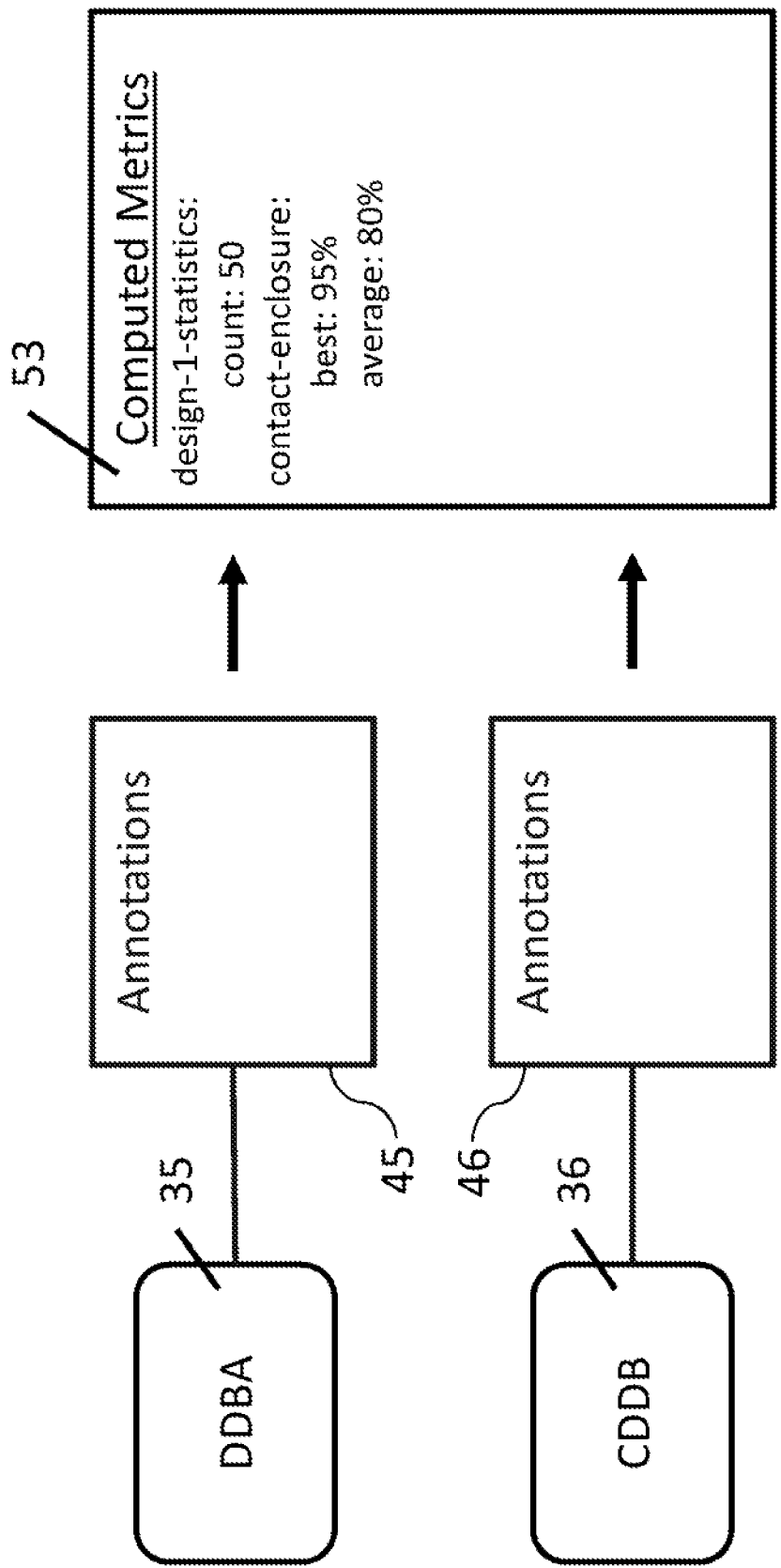
FIG. 20E depicts annotations and computed metrics of physical design sub-configurations of a physical design graph, in accordance with aspects set forth herein.

FIG. 20D depicts annotated characteristics 45 of physical design sub-configuration 35 of the physical design graph 30 (FIG. 20C). In this example, the annotated characteristics 45 indicate certain errors and warnings affiliated with using this structure in forming a physical placement design. In one example, other annotations include physical characteristics, such as orientation, magnification, and layers. In another example, annotations include logical characteristics such as function, inputs, and outputs. In another example, annotations include passive electrical characteristics such as capacitance, impedance and inductance. In another example, annotations include active electrical characteristics such as drive current, leakage, delay and operating voltage. In another example, annotations include manufacturing characteristics such as density, redundancy and manufacturability scoring. In another example, annotations include errors and warnings found within the cell. In another example, annotations include other characteristics relating to the physical placement configuration of multiple cells. Configurations may be chosen for the design of an integrated circuit based on these annotated attributes meeting one or more required design criteria, such as, for example, computing 2 logical AND functions, operating at 0.6V with 10 ps delay and no errors. In a case where more than one configuration meets the required criteria, a more optimal configuration may be chosen to replace a less optimal configuration based on one or more optimization criteria, such as, for example, smaller total width, better manufacturability score, and fewer warnings. In analyzing the physical design configuration graph 10 to determine a proper physical placement, these annotated characteristics 45 will be compared to the annotated characteristics of another pattern, so that the correct pattern with the target characteristics (e.g., low error rate) can be selected instead if needed. For example, FIG. 20E depicts annotated characteristics 45, 46 of physical design sub-configurations 35, 36, respectively, and also depicts computed metrics 53. By computing the appropriate metrics for a given physical design, the system can select the appropriate physical design to meet quality standards.

Associations may be used in conjunction with annotated configuration characteristics to choose which configurations to use in a design. In one example, associations may indicate that the sub-configuration and super-configuration have similar annotated characteristics and meet similar design criteria. Furthering the previous example in more detail, in FIG. 20C, if the DD configuration 31 has the annotated attribute that it has a high manufacturability score, super-configurations DDB 32 and CDD 33 DD, as indicated by association edges 37, maybe be chosen because they are more likely to also have a high manufacturability score attribute. In another example, if DDB configuration is annotated with high manufacturability score but the DD sub-configuration is annotated with a low manufacturability score, the design may be optimized by choosing DDB configuration to replace DD configurations because they meet similar design criteria.

Due to the extreme computational complexity of covering the space of all configuration, software acceleration techniques, such as distributed, parallel, asynchronous computing, and hardware acceleration techniques, such as utilizing graphics and stream processing hardware, are necessary for successful implementation of 1901. Due to the large data volume associated with storing graph, node annotations, and computed metrics, multiple distributed databases 1904 are needed. Furthermore, due to the highly variable structure of stored data, relational databases, key-value databases, and other non-relational databases are used.

Any of the methods or techniques described herein may be implemented to run on a system 1900. For example, some embodiments may be defined as methods, while other embodiments may be systems, processors, or computer program products that are configured to perform those methods.

To the extent that the claims recite the phrase "at least one of in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A method for optimizing an integrated circuit physical design for an integrated circuit with target characteristics using a physical design graph, the physical design graph comprising a plurality of physical design sub-configurations, each of the plurality of physical design sub-configurations including a placement of a group of physical cells and having annotated characteristics, the method comprising the steps of:
   identifying, by searching the integrated circuit physical design, a first physical design sub-configuration including a first placement of a first group of the physical cells and having first annotated characteristics, the first annotated characteristics being outside the target characteristics, the first physical design sub-configuration being for implementing a specific function of the integrated circuit physical design;
   selecting from the physical design graph, based on the first group of the physical cells and by matching the target characteristics, at least a second physical design sub-configuration including a second placement of the first group of the physical cells and being within the target characteristics, the second physical design sub-configuration being for implementing the specific function of the integrated circuit physical design; and
   replacing the first physical design sub-configuration in the integrated circuit physical design with the second physical design sub-configuration by deleting the first physical design sub-configuration and adding the second physical design sub-configuration to the integrated circuit physical design, wherein the replacing does not change the function of the integrated circuit physical design.

2. The method of claim 1, wherein the selecting comprises selecting from the physical design graph, based on the first group of the physical cells and the target characteristics, the second physical design sub-configuration including a second group of the physical cells and a third physical design sub-configuration including a third group of the physical cells, wherein the first group of the physical cells comprises the second and third groups of the physical cells.

3. The method of claim 1, further comprising manufacturing, using the integrated circuit physical design, the integrated circuit.

4. The method of claim 1, wherein the physical design graph comprises associations between a first physical design sub-configuration and a second physical design sub-configuration of the plurality of physical design sub-configurations, the first physical design sub-configuration including a first placement of a first group of the physical cells and the second physical design sub-configuration including a second placement of a second group of the physical cells, the associations being based on the first group being a subset or superset of the second group.

5. The method of claim 1, wherein the placement of the group of the physical cells comprises a linear arrangement of the physical cells.

6. The method of claim 1, wherein the placement of the group of the physical cells comprises a stacked two-dimensional arrangement of the physical cells.

7. The method of claim 1, wherein one of the physical cells comprises one of a logic compute element, a passive electrical structure, an active electrical structure or a manufacturing assistance structure.

8. A method for optimizing an integrated circuit physical design for an integrated circuit with target characteristics, the method comprising:
   providing a physical design graph, the physical design graph comprising a plurality of physical design sub-configurations, each of the plurality of physical design sub-configurations including a placement of a group of physical cells and having annotated characteristics, wherein the placement comprises one or more of linear arrangement or two-dimension arrangement of one or more of the group of physical cells;
   identifying, by searching the integrated circuit physical design, a first physical design sub-configuration including a first placement of a first group of the physical cells and having first annotated characteristics, the first annotated characteristics being outside the target characteristics, the first physical design sub-configuration being for implementing a specific function of the integrated circuit physical design;

selecting from the physical design graph, based on the first group of the physical cells and by matching the target characteristics, at least a second physical design sub-configuration including a second placement of the first group of the physical cells and being within the target characteristics, the second physical design sub-configuration being for implementing the specific function of the integrated circuit physical design;

replacing the first physical design sub-configuration in the integrated circuit physical design with the second physical design sub-configuration by deleting the first physical design sub-configuration and adding the second physical design sub-configuration to the integrated circuit physical design, wherein the replacing does not change the function of the integrated circuit physical design, wherein the replacing does not change the function of the integrated circuit physical design; and manufacturing, using the integrated circuit physical design, the integrated circuit.

9. The method of claim 8, wherein the selecting comprises selecting from the physical design graph, based on the first group of the physical cells and the target characteristics, the second physical design sub-configuration including a second group of the physical cells and a third physical design sub-configuration including a third group of the physical cells, wherein the first group of the physical cells comprises the second and third groups of the physical cells.

10. The method of claim 8, wherein the physical design graph comprises associations between a first physical design sub-configuration and a second physical design sub-configuration of the plurality of physical design sub-configurations, the first physical design sub-configuration including a first placement of a first group of the physical cells and the second physical design sub-configuration including a second placement of a second group of the physical cells, the associations being based on the first group being a subset or superset of the second group.

11. The method of claim 8, wherein the physical cells comprise one or more of a logic compute element, a passive electrical structure, an active electrical structure or a manufacturing assistance structure.

12. The method of claim 8, wherein the physical cells comprise a passive electrical structure and an active electrical structure.

13. A method for optimizing an integrated circuit physical design for an integrated circuit with target characteristics, the method comprising:

providing a physical design graph, the physical design graph comprising a plurality of physical design sub-configurations, each of the plurality of physical design sub-configurations including a placement of a group of physical cells and having annotated characteristics, wherein the placement comprises one or more of linear arrangement or two-dimension arrangement of one or more of the group of physical cells, wherein the physical cells comprise a manufacturing assistance structure and one or more of a logic compute element, a passive electrical structure or an active electrical structure;

identifying by searching the integrated circuit physical design, a first physical design sub-configuration including a first placement of a first group of the physical cells and having first annotated characteristics, the first annotated characteristics being outside the target characteristics, the first physical design sub-configuration being for implementing a specific function of the integrated circuit physical design;

selecting from the physical design graph, based on the first group of the physical cells and by matching the target characteristics, at least a second physical design sub-configuration including a second placement of the first group of the physical cells and being within the target characteristics, the second physical design sub-configuration being for implementing the specific function of the integrated circuit physical design;

replacing the first physical design sub-configuration in the integrated circuit physical design with the second physical design sub-configuration by deleting the first physical design sub-configuration and adding the second physical design sub-configuration to the integrated circuit physical design, wherein the replacing does not change the function of the integrated circuit physical design; and manufacturing, using the integrated circuit physical design, the integrated circuit.

14. The method of claim 13, wherein the selecting comprises selecting from the physical design graph, based on the first group of the physical cells and the target characteristics, the second physical design sub-configuration including a second group of the physical cells and a third physical design sub-configuration including a third group of the physical cells, wherein the first group of the physical cells comprises the second and third groups of the physical cells.

15. The method of claim 13, wherein the physical design graph comprises associations between a first physical design sub-configuration and a second physical design sub-configuration of the plurality of physical design sub-configurations, the first physical design sub-configuration including a first placement of a first group of the physical cells and the second physical design sub-configuration including a second placement of a second group of the physical cells, the associations being based on the first group being a subset or superset of the second group.

* * * * *

UNITED STATES PATENT AND TRADEMARK OFFICE
CERTIFICATE OF CORRECTION

| | | |
|---|---|---|
| PATENT NO. | : 11,714,944 B2 | Page 1 of 1 |
| APPLICATION NO. | : 17/139016 | |
| DATED | : August 1, 2023 | |
| INVENTOR(S) | : Vito Dai et al. | |

It is certified that error appears in the above-identified patent and that said Letters Patent is hereby corrected as shown below:

In the Claims

Claim 8:
Column 19 Lines 16-19 change "wherein the replacing does not change the function of the integrated circuit physical design, wherein the replacing does not change the function of the integrated circuit physical design;" to --wherein the replacing does not change the function of the integrated circuit physical design;--

Signed and Sealed this
Tenth Day of October, 2023

Katherine Kelly Vidal
*Director of the United States Patent and Trademark Office*